United States Patent
Li et al.

(10) Patent No.: US 12,382,123 B2
(45) Date of Patent: Aug. 5, 2025

(54) DISPLAY APPARATUS AND DISPLAY METHOD

(71) Applicant: VIDAA (NETHERLANDS) INTERNATIONAL HOLDINGS B.V., Duiven (NL)

(72) Inventors: Chunyu Li, Duiven (NL); Peng Li, Duiven (NL); Jianmin Kang, Duiven (NL); Jinbo Li, Duiven (NL); Yusan Yang, Duiven (NL); Yongjian Zhao, Duiven (NL); Li Man, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 50 days.

(21) Appl. No.: 18/538,981

(22) Filed: Dec. 13, 2023

(65) Prior Publication Data

US 2024/0121464 A1 Apr. 11, 2024

Related U.S. Application Data

(63) Continuation of application No. PCT/EP2022/070187, filed on Jul. 19, 2022.

(30) Foreign Application Priority Data

Jul. 20, 2021 (CN) .......................... 202110820781.9
Jul. 23, 2021 (CN) .......................... 202110835240.3
Sep. 22, 2021 (CN) .......................... 202111107225.3

(51) Int. Cl.
*H04N 21/422* (2011.01)

(52) U.S. Cl.
CPC ............................ *H04N 21/42228* (2013.01)

(58) Field of Classification Search
CPC .......................... H04N 21/42228; G08C 23/04
See application file for complete search history.

(56) References Cited

U.S. PATENT DOCUMENTS 6,351,599 B1 * 2/2002 Komeno ............... G11B 27/002
386/292
6,914,637 B1 * 7/2005 Wolf ...................... H04N 19/89
348/476

(Continued)

FOREIGN PATENT DOCUMENTS

CN 101820514 A 9/2010
CN 102833399 A 12/2012

(Continued)

OTHER PUBLICATIONS

The China National Intellectual Property Administration (CNIPA) Notification of the First Office Action for CN Application No. 202111107225.3 Jan. 30, 2024 16 Pages (Including English translation).

(Continued)

*Primary Examiner* — Michael B. Pierorazio
(74) *Attorney, Agent, or Firm* — ANOVA LAW GROUP, PLLC

(57) ABSTRACT

Disclosed are a display apparatus and a display method. The display apparatus includes a display; a remote controller, including multiple keys and configured to: output an infrared signal carrying a first infrared key value in response to selection of an integrated key from the user, the integrated key is configured for replacing at least two omitted keys not disposed on the remote controller, the omitted keys are keys not arranged on the remote controller; and a controller is configured to: identify an infrared key value of an infrared signal corresponding to the integrated key; control the display to display a key interface when the infrared key value being the first infrared key value; the key interface (Continued)

includes at least two first controls corresponding to the omitted keys; and generate a target infrared key value when a selection of one of the at least two first controls from the user.

20 Claims, 17 Drawing Sheets

(56) References Cited

U.S. PATENT DOCUMENTS

| | | | | |
|---|---|---|---|---|
| 7,131,004 | B1* | 10/2006 | Lyle | H04L 9/12 |
| | | | | 713/169 |
| 7,206,943 | B2* | 4/2007 | Kobayashi | H04L 9/0897 |
| | | | | 713/193 |
| 7,242,766 | B1* | 7/2007 | Lyle | H04L 9/3271 |
| | | | | 380/2 |
| 9,354,785 | B1 | 5/2016 | Jiang | |
| 2005/0066356 | A1* | 3/2005 | Stone | H04N 21/4408 |
| | | | | 380/255 |
| 2005/0259533 | A1* | 11/2005 | Sakagami | G11B 17/056 |
| | | | | 369/47.1 |
| 2007/0086725 | A1* | 4/2007 | Sakasegawa | H04N 21/4184 |
| | | | | 348/E5.102 |
| 2007/0266397 | A1 | 11/2007 | Lin | |
| 2007/0274348 | A1* | 11/2007 | Friedman | H04J 3/0697 |
| | | | | 370/503 |
| 2008/0180518 | A1* | 7/2008 | Miyazaki | H04N 21/4405 |
| | | | | 375/E7.025 |
| 2008/0307496 | A1* | 12/2008 | Kurose | H04N 21/4367 |
| | | | | 726/2 |
| 2009/0040287 | A1* | 2/2009 | Miyazaki | H04N 21/4367 |
| | | | | 348/14.01 |
| 2010/0037253 | A1* | 2/2010 | Sheehan | H04N 21/23424 |
| | | | | 725/35 |
| 2015/0277840 | A1* | 10/2015 | Ninan | G09G 5/026 |
| | | | | 345/589 |
| 2016/0012772 | A1* | 1/2016 | White | G09G 3/2092 |
| | | | | 345/80 |

FOREIGN PATENT DOCUMENTS

| | | |
|---|---|---|
| CN | 104104981 A | 10/2014 |
| CN | 107094238 A | 8/2017 |
| CN | 107682748 A | 2/2018 |
| CN | 107948746 A | 4/2018 |
| CN | 112672195 A | 4/2021 |
| CN | 112911359 A | 6/2021 |

OTHER PUBLICATIONS

The World Intellectual Property Organization (WIPO) International Search Report and Written Opinion for PCT/EP2022/070187 Nov. 23, 2022 2 pages.

The China National Intellectual Property Administration (CNIPA) Notification of the First Office Action for CN Application No. 202110820781.9 Jun. 29, 2023 16 Pages (Including English translation).

The China National Intellectual Property Administration (CNIPA) Notification of the Second Office Action for CN Application No. 202110820781.9 Oct. 11, 2023 15 Pages (Including English translation).

* cited by examiner

DISPLAY APPARATUS AND DISPLAY METHOD

CROSS REFERENCE TO RELATED APPLICATIONS

This application is a continuation application of International Application No. PCT/EP202211070187, filed on Jul. 19, 2022, which claims the benefit of priorities to Chinese Patent Application No. 202110820781.9, filed on Jul. 20, 2021, Chinese Patent Application No. 202111107225.3, filed on Sep. 22, 2021, and Chinese Patent Application No. 202110835240.3, filed on Jul. 23, 2021, the entire contents of which are incorporated herein by reference.

FIELD

The disclosure relates to the field of display, and in particular to a display apparatus and a display method.

BACKGROUND

After the remote controller, the interaction medium between the user and the display apparatus, converts the user's operation into the corresponding infrared key value and transmits the infrared key value to the controller of the display apparatus, the controller responds to the infrared key value.

In recent years, the display apparatus has been developed rapidly, some of which are designed to be more competitive. In order to adapt to increasing functions of the display apparatus, it is necessary to add corresponding keys on the remote controller, resulting in more keys on the remote controller. For example, as the voice function is added for some display apparatus, a key for receiving the user's voice is required for the remote controller accordingly. The user can issue a voice command for the display apparatus by selecting the key for voice command, and then the controller is triggered to receive user's voice data.

The increase in the number of keys on the remote controller will affect the user experience. Thus, there is a need to simplify keys on the remote controller.

SUMMARY

Embodiments of the disclosure provide a display apparatus and a display method.

In a first aspect, the embodiments of the disclosure disclose a display apparatus. The display apparatus includes: a display; a remote controller, provided with a plurality of keys and configured to: output an infrared signal carrying a first infrared key value in response to a selection of an integrated key from the user, wherein the integrated key is configured for replacing at least two omitted keys not disposed on the remote controller; and a controller in connection with the display and configured to be able to respond a key event corresponding to a omitted key which is not disposed on the remote controller; the controller is configured to: identify an infrared key value of an infrared signal corresponding to the integrated key received from the remote controller; control the display to display a key interface in response to the infrared key value being the first infrared key value, wherein the key interface comprises at least two first controls corresponding to the at least two omitted keys, wherein one first control corresponds to one key omitted on the remote controller; and generate a target infrared key value in response to a selection of one of the at least two first controls from the user, wherein the target infrared key value is a key value of a omitted key corresponding to the selected first control.

The embodiments of the disclosure disclose a display method for a display apparatus, the method includes: identifying an infrared key value of an infrared signal corresponding to an integrated key received from a remote controller; where the remote controller includes a plurality of keys and configured to: output an infrared signal carrying a first infrared key value in response to a selection of an integrated key from the user, the integrated key is configured for replacing at least two omitted keys not disposed on the remote controller; controlling a display of the display apparatus to display a key interface in response to the infrared key value being the first infrared key value, where the key interface includes at least two first controls corresponding to the at least two omitted keys, one first control corresponds to one key omitted on the remote controller; and generating a target infrared key value in response to a selection of one of the at least two first controls from the user, where the target infrared key value is a key value of a omitted key corresponding to the selected first control.

DETAILED DESCRIPTION OF THE EMBODIMENTS

In order to make the objectives and implementations of the disclosure clearer, the exemplary implementations of the disclosure will be described clearly and completely below with reference to the drawings in the exemplary embodiments of the disclosure. Obviously, the exemplary embodiments described are some rather than all of the embodiments of the disclosure.

Figure 1:
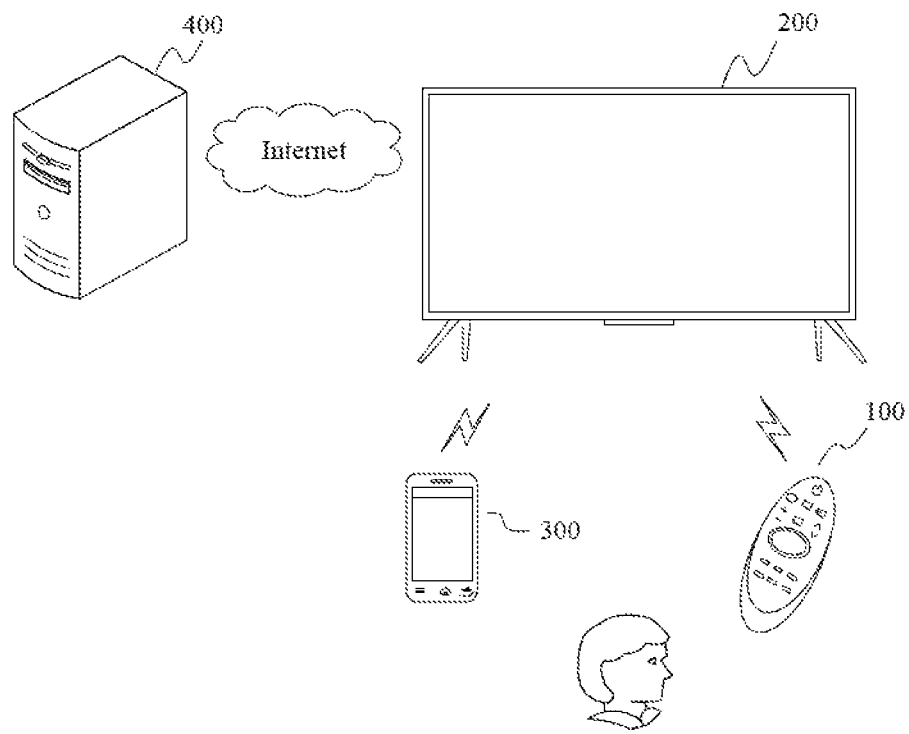
FIG. 1 is a schematic diagram of a scenario of a display apparatus according to some embodiments.

FIG. 1 is a schematic diagram of a display apparatus according to an embodiment. As shown in FIG. 1, a display apparatus 200 is further in data communication with a server 400. A user may operate the display apparatus 200 via a smart device 300 or a control device 100.

In some embodiments, a control device 100 may be a remote controller, communication between the remote controller and a display apparatus includes at least one of infrared protocol communication, Bluetooth protocol communication and other short-distance communication, and the control device controls the display apparatus 200 by means of a wireless or wired method. A user may input a command by means of at least one of a key, a voice input, a control panel input, etc. on the remote controller to control the display apparatus 200.

In some embodiments, a smart device 300 may include any one of a mobile terminal, a tablet computer, a computer, a notebook computer, an augmented reality (AR) device, a virtual reality (VR) device, etc.

In some embodiments, a smart device 300 may be used to control a display apparatus 200. For example, an application running on the smart device is used to control the display apparatus 200.

In some embodiments, a smart device 300 may be used to be in data communication with a display apparatus.

In some embodiments, a display apparatus 200 may be controlled by adopting a manner other than a control device 100 and a smart device 300. For example, a module for obtaining a voice instruction arranged inside the display apparatus 200 directly receives a voice instruction from a user, or a voice control device arranged outside the display apparatus 200 receives a voice instruction from a user.

In some embodiments, the display apparatus 200 is further in data communication with a server 400. The display apparatus 200 is allowed to be in communication with the server via a local area network (LAN), a wireless local area network (WLAN) or other networks. The server 400 may provide various contents and interactions for the display apparatus 200.

Figure 2:
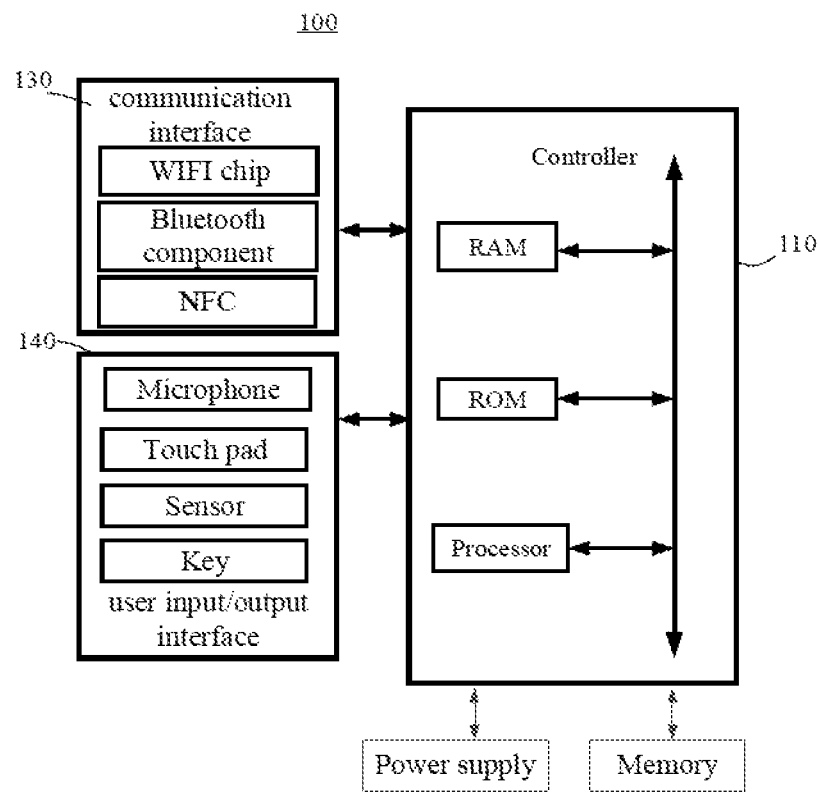
FIG. 2 is a block diagram of hardware configuration of a control device 100 according to some embodiments.

FIG. 2 is a configuration block diagram of a control device 100 according to some embodiments. As shown in FIG. 2, the control device 100 includes a controller 110, a communication interface 130, a user input/output interface 140, a memory (such as a random access memory (RAM)), and a power supply. The control device 100 may receive a command from the user, and converts the command into an instruction that may be identified and responded by a display apparatus 200. The control device 100 is configured to realize an interaction between the user and the display apparatus 200.

In some embodiments, the communication interface 130 is used for communication with outside, and includes at least one of a WIFI chip, a Bluetooth module, a near field communication (NFC) module or an alternative module.

In some embodiments, a user input/output interface 140 includes at least one of a microphone, a touch pad, a sensor, a key or an alternative module.

Figure 3:
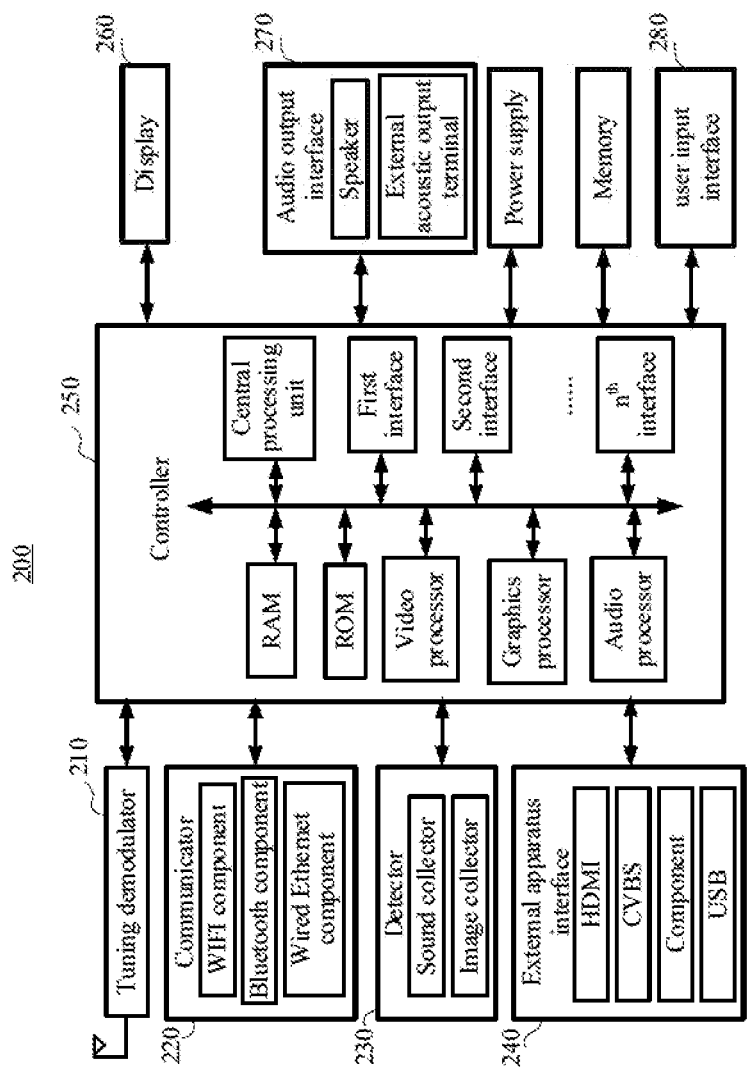
FIG. 3 is a block diagram of hardware configuration of a display apparatus 200 according to some embodiments.

FIG. 3 shows a block diagram of hardware configuration of a display apparatus 200 according to some embodiments.

In some embodiments, the display apparatus 200 includes at least one of a modem 210, a communicator 220, a detector 230, an external device interface 240, a controller 250, a display 260, an audio output interface 270, a memory, a power supply and a user input interface.

In some embodiments, a controller includes a central processing unit, a video processing unit, an audio processing unit, a graphics processing unit, an RAM, a read only memory (ROM), and a first interface to an $n^{th}$ interface for input/output, wherein n is an integer greater than or equal to 1.

In some embodiments, the display 260 includes a panel component for presenting an image and a drive component for driving image display, and is configured to receive a picture signal output from a controller, and present a video content, an image, an element for menu operation, a user interface (UI) for operation, etc.

In some embodiments, the display 260 may be at least one of a liquid crystal display, an organic light-emitting diode (OLED) display, or a projection display, and may further be a projection device and a projection screen.

In some embodiments, the modem 210 receives a broadcast television signal by means of a wired or wireless method, and demodulates audio and video signals, such as an electronic program guide (EPG) data signal, from a plurality of wireless or wired broadcast television signals.

In some embodiments, the communicator 220 is a component for being in communication with an external device or a server according to various communication protocols. For example, the communicator may include at least one of a Wifi module, a Bluetooth module, a wired ethernet module, other network communication protocol chips or near field communication protocol chips, and an infrared receiver. A display apparatus 200 may send and receive a control signal and a data signal with a control device 100 or a server 400 by means of the communicator 220.

In some embodiments, the detector 230 is used for collecting a signal from an external environment or a signal interacting with an outside. For example, the detector 230 includes a light receiver, and a sensor for collecting ambient light intensity, or, the detector 230 includes an image collector, such as a camera, which may be used for collecting external environment scenes, user attributes or user interaction gestures, or, the detector 230 includes a sound collector, such as a microphone, which is used for receiving external sound.

In some embodiments, an external device interface 240 may include, but not limited to, any one or more of the following interfaces: a high definition multimedia interface (HDMI), an analog or data high-definition component input interface (component), a composite video input interface, a composite video broadcast signal (CABS), a universal serial bus (USB) input interface, and a red, green and blue (RGB) port, and may also be a composite input/output interface formed by a plurality of interfaces.

In some embodiments, the controller 250 and the modem 210 may be arranged in different individual devices, that is, the modem 210 may also be in an external device of a main device in which the controller 250 is located, such as an external set-top box.

In some embodiments, a controller 250 controls work of the display apparatus and responds to operations from a user via various software control programs stored on a memory. The controller 250 controls an overall operation of a display apparatus 200.

In some embodiments, a controller includes at least one of a central processing unit (CPU), a video processing unit, an audio processing unit, a graphics processing unit (GPU), an RAM, an ROM, a first interface to an nth interface for input/output, a communication bus, etc.

In some embodiments, a graphics processing unit is used for generating various graphic objects, such as at least one of an icon, an operation menu and a display graphic of an instruction from a user. The graphics processing unit includes an arithmetic unit, which carries out arithmetic by receiving various interaction instructions from a user and displays various objects according to display attributes. The graphics processing unit further includes a renderer for rendering various objects obtained on the basis of the arithmetic unit, and the above rendered objects are used for being presented on a display.

In some embodiments, the user may input a user command on the graphical user interface (GUI) displayed on the display 260, and then the user input interface receives, via the GUI, a command from the user. Alternatively, the user may input a user command by inputting a specific sound or gesture, and then a user input interface identifies the sound or gesture by means of a sensor to receive the user command.

In some embodiments, the user input interface 280 is an interface (such as a physical key on a body of a display apparatus) which can receive control input.

In some embodiments, a system of a display apparatus may include a kernel, a shell, a content system, and an application. The kernel, the shell and the content system constructs a basic operating system structure that allows a user to do content management.

Figure 4:
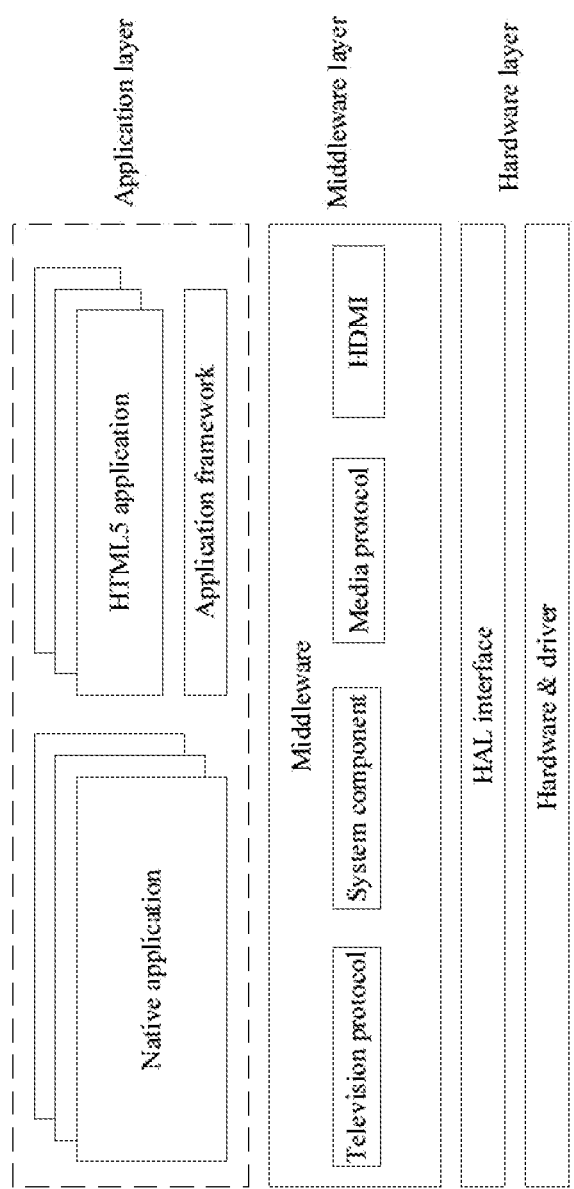
FIG. 4 is a diagram of software configuration of a display apparatus 200 according to some embodiments.

As shown in FIG. 4, a system of a display apparatus is divided into three layers; an application layer, a middleware layer and a hardware layer from top to bottom respectively.

The application layer mainly includes common applications on a television and an application framework, where the common applications are mainly applications developed on the basis of a browser, such as hypertext markup language (HTML) 5 applications (apps) and native apps.

The application framework is a program model, and has all basic functions required by standard application software, such as file access and data exchange; and the application framework further includes interfaces for a toolbar, a status bar, a menu and a dialog box; and the native apps may support online or offline work, and message push or local resource access.

The middleware layer includes middleware such as various television protocols, multimedia protocols and system assemblies. The middleware may use a basic service (function) provided by system software to link applications of various parts of an application system on a network or different applications, so as to achieve resource sharing and function sharing.

The hardware layer mainly includes a hardware abstraction layer (HAL) interface, hardware and a driver, where the HAL interface is a uniform interface for connecting with all chips in the display apparatus, and specific logic thereof is achieved by all the chips. The driver mainly includes: an audio driver, a panel driver, a Bluetooth driver, a camera driver, a WIFI driver, a universal serial bus (USB) driver, an HDMI driver, a sensor driver (such as a fingerprint sensor, a temperature sensor and a pressure sensor), a power driver, etc.

In some embodiments, after a display apparatus is started, a display interface of a signal source selected previous or a signal source selection interface may be directly shown, the signal source may be a preset video-on-demand program, and may also be at least one of an HDMI interface, a live broadcast interface, etc., and after a user selects different signal sources, a display may display contents obtained from different signal sources.

The display apparatus may provide functions of playing audio and video data for users. For example, the display apparatus may search channels via a set-top box, and after a channel search is completed, the display apparatus may play programs for that channel.

In order to adapt to more functions of the display apparatus, it is necessary to add corresponding keys on the remote controller, resulting in more keys on the remote controller. For example, as the voice function is added for some display apparatus, a key for voice input is required for the remote controller accordingly. The user can issue a voice command by selecting the key for voice input, and then the controller is capable of identifying the user voice. However, the increase in the number of keys on the remote controller will affect the user experience. Thus, there is a need to simplify keys on the remote controller.

In view of the above issue, on the basis of the display apparatus shown in the above embodiments, the embodiments further improve the display apparatus. The display apparatus at least includes: a controller, a display and a remote controller.

In the disclosure, the display is used for displaying content on a user interface. The user interface may display different contents in different application scenarios. A content displayed by the user interface may be, but not limited to, boot animation, media resources and system homepage. For example, in a starting process of the display apparatus, the user interface may show the boot animation; and the display apparatus completes preparation work of startup, and the interface skips from the boot animation to the system homepage. In the embodiments, a display content of the system homepage is not limited, for example, large-screen homepage may display an icon of an application installed on the display apparatus and may display a search interface. In an application scenario that a user starts a video APP, the interface may play a multimedia resource.

In the disclosure, a remote controller has a plurality of keys. The remoter controller is configured to: output infrared signals in response to a selection of a key from a user, where one of the key may be an integrated key; and output a first infrared key value in response to selection of the integrated key from the user, the integrated key is used for replacing at least two omitted keys, so as to reduce the number of the plurality of keys arranged on the remote controller, and the at least two omitted keys are keys that are not arranged on the remote controller.

Figure 5:
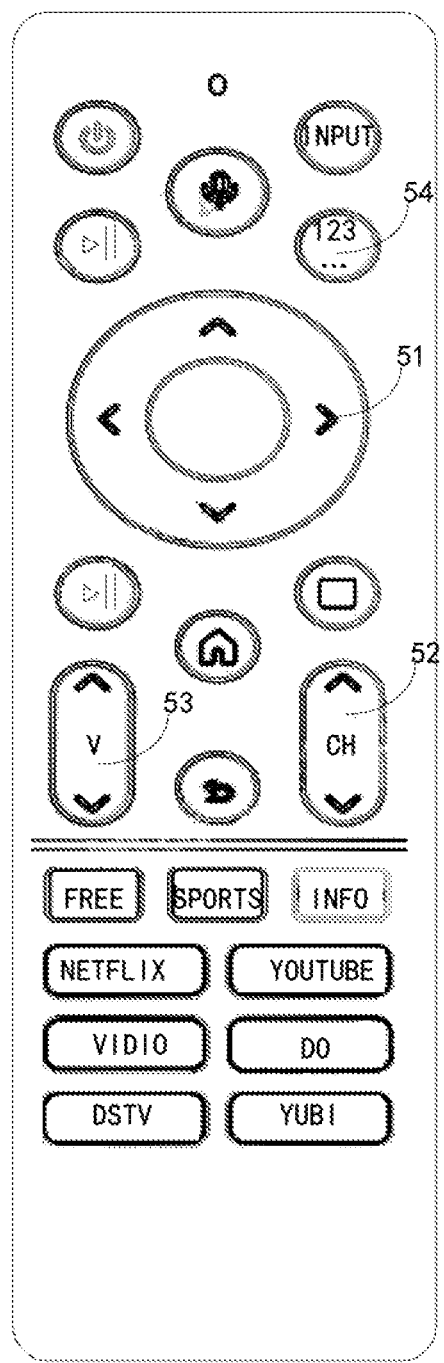
FIG. 5 is a front view of a remote controller according to some embodiments.

The remote controller shown in the embodiments will be described below with reference to specific drawings. FIG. 5 is a front view of a remote controller shown in some embodiments. It may be seen that an upper surface of the remote controller has a plurality of keys, which may include a focus move key 51, a channel switching key 52, a sound adjustment key 53, an integrated key 54, etc. It's worth noting that FIG. 5 is only for illustration. More or less keys can be configured on the remote controller.

Figure 6:
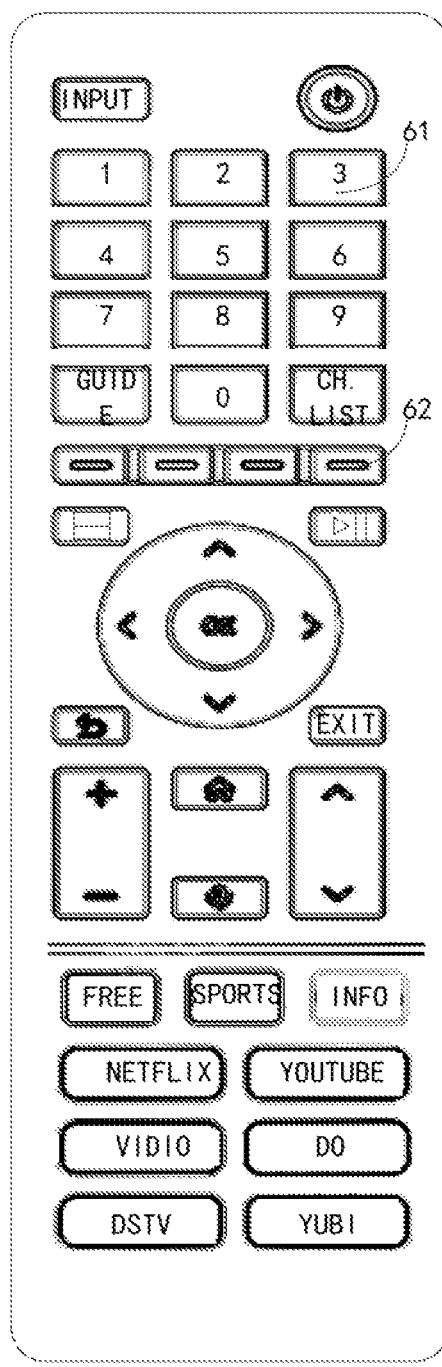
FIG. 6 is a front view of a remote controller provided in the related art.

In the embodiments, the integrated key is used for replacing at least two omitted keys, and the at least two omitted keys are keys that are not arranged on the remote controller. For example, the at least two omitted keys may be 10 digital keys. Illustration is made below with reference to the specific drawings. FIG. 6 is a front view of a remote controller provided in the related art. It may be seen that the remote controller provided in FIG. 6 is provided with 10 digital keys 61, and compared with the remote controller provided in FIG. 6, the remote controller provided in FIG. 5 replaces the 10 digital keys 61 (which may also be referred to as omitted keys in the embodiments) in the remote controller provided in FIG. 6 with the integrated key 54. In some embodiments, the omitted keys may be shortcut keys 62 in FIG. 6 (in some application scenarios, the shortcut keys may also be referred to as colour keys).

With the remote controller provided in FIG. 5 as an example below, the remote controller provided in the embodiments, which may reduce the number of keys, is described.

It may be visually seen from FIG. 5 that the remote controller in FIG. 5 is not provided with digital keys and colour keys, but is additionally provided with a 123/colour key (which may be referred to as an integrated key in the embodiments), and the 123/colour key is equivalent to the sum of ten digital keys and four colour keys, that is, thirteen keys of the remote controller may be omitted on the whole, and the number of the omitted keys accounts for 29% of the total number of keys of the remote controller provided in FIG. 6.

Figure 7:
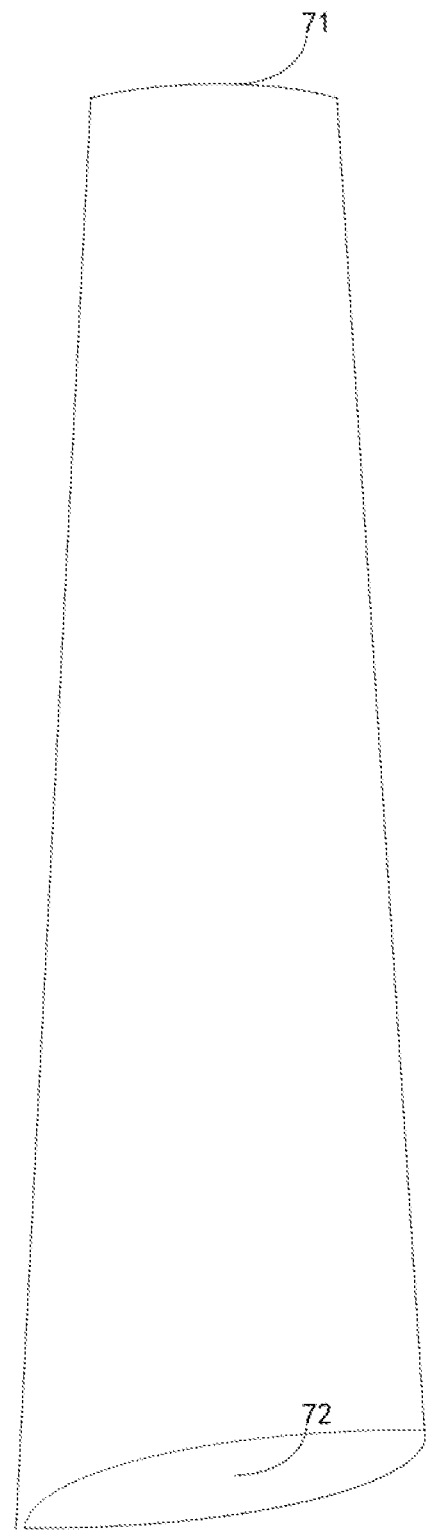
FIG. 7 is a side view of a remote controller according to some embodiments.

In some embodiments, the remote controller includes a first end and a second end opposite to the first end, where the first end is used for emitting infrared signals, and for most remote controllers, a cross section of the second end is greater than a cross section of the first end, and an end surface of the second end is plane. The structure of the remote controller will be described below with reference to specific drawings. FIG. 7 is a side view of a remote controller in some embodiments. It may be seen that the remote controller includes first end 71 and second end 72, where the second end 72 are widened, and the end surface of the second end 72 are plane, so as to make the remote controller capable of being placed in a standing manner. The remote controller may be vertically disposed and maintained stable, such that the aesthetic degree of the remote controller is greatly improved, and the remote controller occupies not much space.

In some embodiments, keys on a remote controller further include commonly-used keys, where the commonly-used keys are arranged on a side adjacent to first end. In the embodiments, the commonly-used keys may be keys which are used with a frequency greater than a preset frequency, and the preset frequency may be set according to requirements. The commonly-used keys include, but not limited to, a power key, a SOURCE key, a play key, a voice key, etc., and these keys are the most common keys for a display apparatus at a present stage. The remote controller in the embodiments arrange the commonly used keys on a side adjacent to the first end of the remote controller, such that the commonly-used keys are located at more noticeable area, thereby improving user experience.

Figure 8:
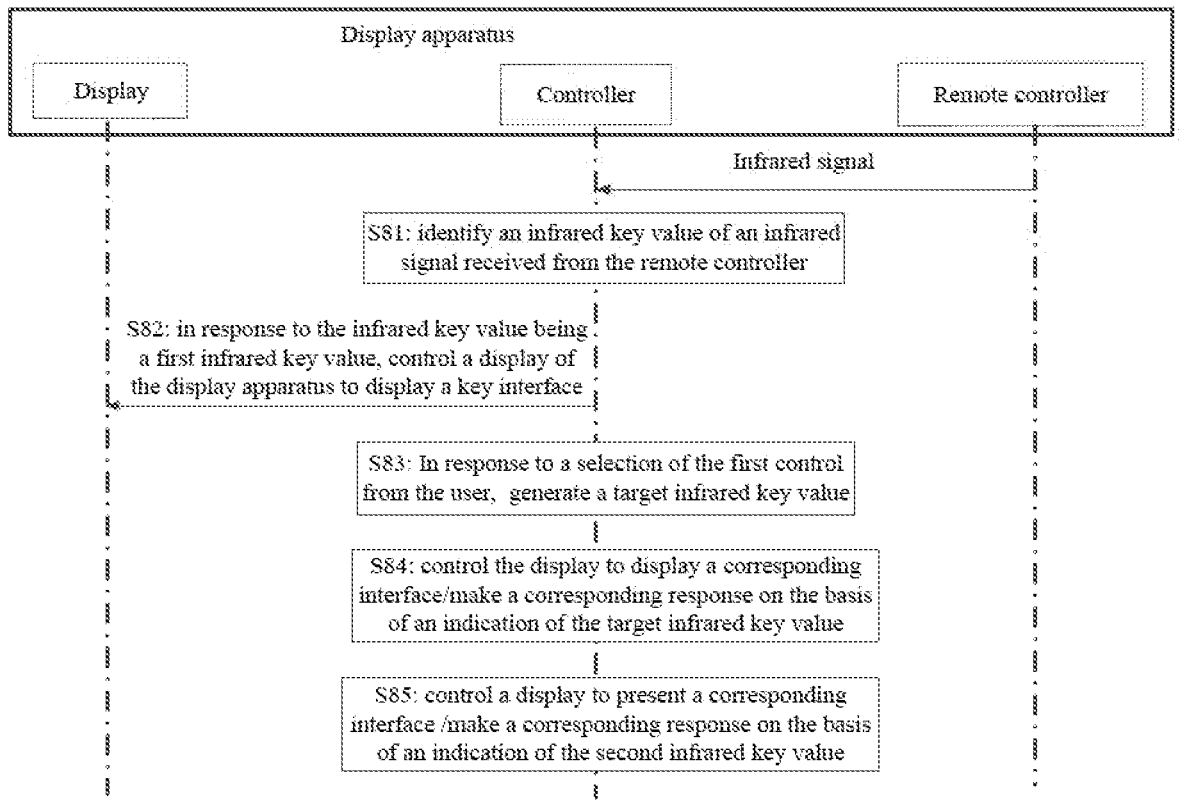
FIG. 8 is a flow diagram of interaction of components in a display apparatus according to some embodiments.

Operations of the display apparatus will be described below with reference to specific drawings. FIG. 8 is a flow diagram of interaction of components in a display apparatus in some embodiments:

a controller of the display apparatus is configured to: identify an infrared key value of an infrared signal received from the remote controller (S81);

in response to the infrared key value being a first infrared key value, control a display of the display apparatus to display a key interface (S82).

In the disclosure, the key interface at least includes two first controls, where each of the first controls uniquely corresponds to one omitted key. In the embodiments, the first control may replace a key on the remote controller to serve as an interaction medium between the user and the controller. In the embodiments, one first control is displayed on the key interface, one less key may be arranged on the remote controller accordingly.

Figure 9:
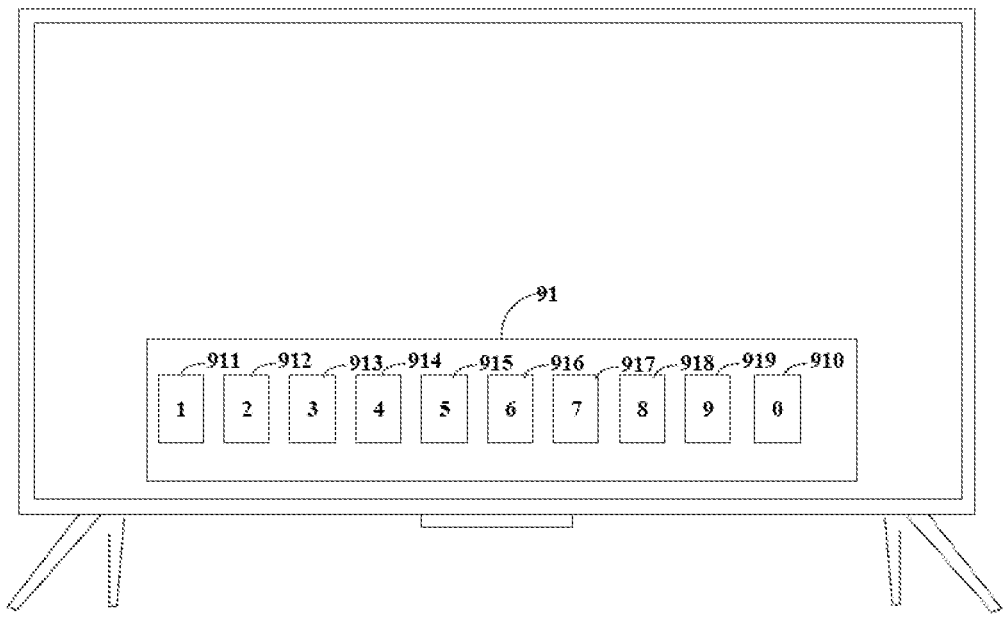
FIG. 9 is a schematic diagram of a display apparatus according to some embodiments.

The key interface is described below with reference to specific drawings. FIG. 9 is a schematic diagram of a display apparatus in some embodiments, wherein a display of the display apparatus shows a key interface 91, and first controls arranged in the key interface in the embodiments include: a control 910, a control 911, a control 912, a control 913, . . . , and a control 919. The control 910 corresponds to a digit key 0 in a remote controller, the control 911 corresponds to a digit key 1 in the remote controller, . . . , and the control 919 corresponds to a digit key 9 in the remote controller. Therefore, the digit key 0, the digit key 1, . . . , and the digit key 9 are required to configure on the remote controller in the embodiments.

In order to make a key interface presented in a concise form, in some embodiments, the key interface further includes at least one drop-down control, where a drop-down control corresponds to a group of the first controls; the controller is further configured to: in response to selection of the drop-down controls from a user, control the display to display a key sub-interface, and the key sub-interface includes a group of first controls corresponding to the drop-down control.

In the embodiments, the principle of grouping is not limited for example, in some embodiments, the first controls may be clustered according to functions of the keys. For example, a control 0 (corresponding to a digital key 0 on the remote controller), a control 1 (corresponding to a digital key 1 on the remote controller), a control 2 (corresponding to a digital key 2 on the remote controller), . . . , and a control 9 (corresponding to a digital key 9 on the remote controller) may be clustered into a group, and a drop-down control corresponding to the group of first controls is a digital drop-down control. For another example, in some embodiments, a control with red color (corresponding to a red color key on the remote controller), a control with blue color (corresponding to a blue color key on the remote controller), a control with green color (corresponding to a green color key on the remote controller), and a control with yellow color (corresponding to a yellow color key on the remote controller) may be clustered into a group, and a drop-down control corresponding to the group of first controls is a shortcut drop-down control.

It should be noted that the red key, the blue key, the yellow key, and the green key in the embodiments are collectively referred to as colour keys. Generally, there are the red key, the green key, the blue key and the yellow key on the remote controller in the form of reserved shortcut keys. The function corresponding to each of the keys may be configured according to actual requirements, for example, the blue key may directly start USB playing, the red key may enter a low blue light mode, the yellow key may enter a motion playing mode, etc., and generally, the colour keys may enter a certain mode in shortcut manner, and therefore, in the embodiments, the drop-down controls corresponding to the colour controls are referred as a shortcut drop-down control.

Figure 10:
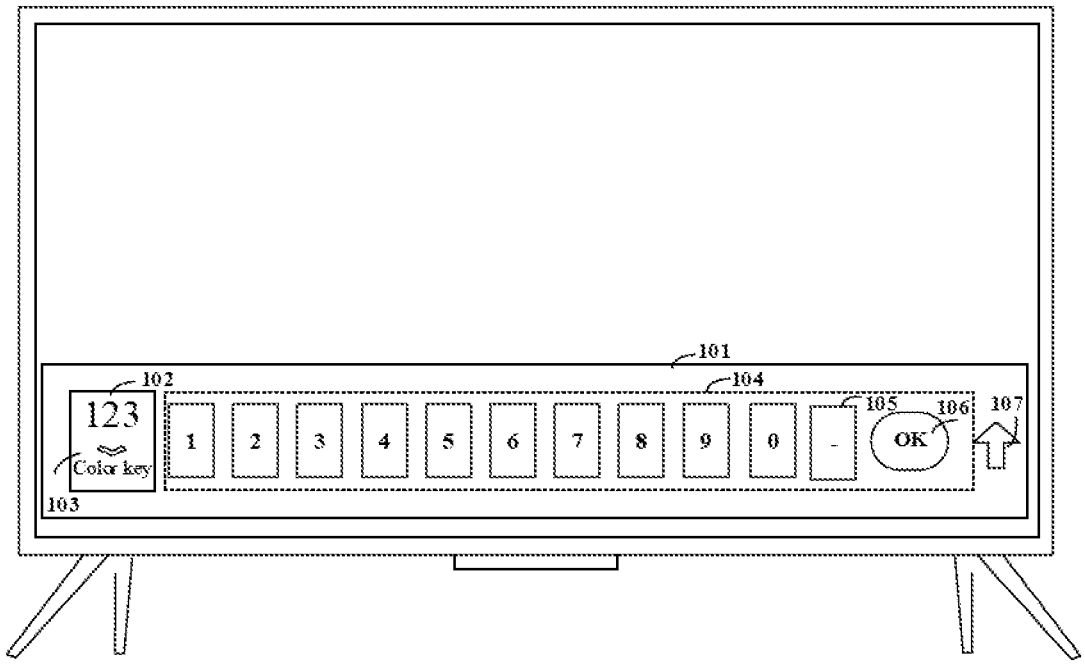
FIG. 10 is a schematic diagram of a display apparatus according to some embodiments.
Figure 11:
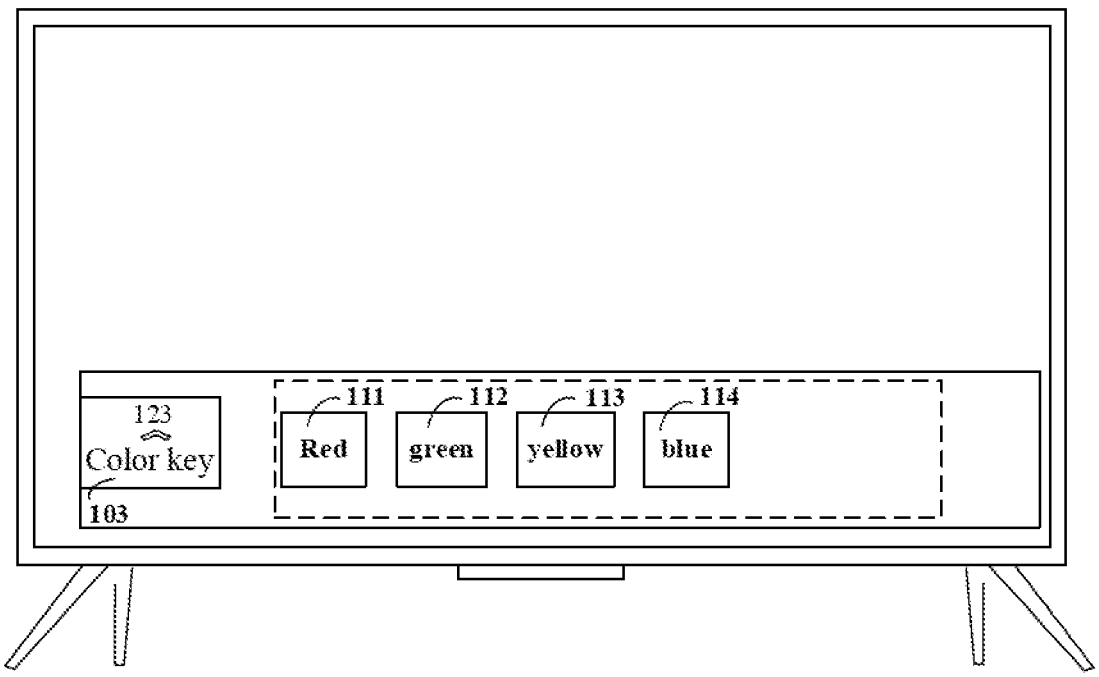
FIG. 11 is a schematic diagram of a display apparatus according to some embodiments.

A display mode of a prompt interface is described below with reference to specific drawings. FIGS. 10 and 11 are schematic diagrams of a display apparatus in some embodiments. A display of the display apparatus in the figures shows a key interface 101, the key interface in the embodiments is provided with a digital drop-down control 102 and a shortcut drop-down control 103, the display may show a key sub-interface 104 of the digital drop-down control 102 in response to a selection of the digital drop-down control 102 from the user, and the key sub-interface 104 in the embodiments includes: a "control 0", a "control 1", . . . , and a "control 9". In some embodiments, in response to selection of an integrated control from a user, a controller may control the display to directly show a digital drop-down control 102, a shortcut drop-down control 103, and a key sub-interface 104. When the user selects the shortcut drop-down control 103, the display may show a key sub-interface of the colour drop-down control, and the key sub-interface in the embodiments include a red control 111, a green control 112, a yellow control 113, and a blue control 114, which may refer to FIG. 11.

With further reference to FIG. 10, in some embodiments, a key sub-interface 104 of a digital drop-down control 102 may further include a special character control 105, where key values corresponding to the special character control 105 in different contexts are different, for example, in a context of inputting a password, the special character control 105 corresponds to ".". For another example, in a context of channel switching, a special character control 10A corresponds to "-", and a user wants to switch to "4-1", the user may sequentially select "4", the special character control 102, and "1" in FIG. 10.

In some embodiments, each time in response to selection of a first digital control from a user, a controller of the display apparatus does not respond to an infrared key value generated immediately, but waits for a certain time (which may be referred to as waiting time in the embodiments, the embodiments does not limit duration of the waiting time, and the waiting time may be set according to requirements, for example, in some embodiments, waiting time may be 3 seconds), if the user selects a second digital control within the waiting time, the controller records infrared key values generated associated with the first digital control and the second digital control, and this key value recording is sequentially carried out until the user does not select a digital control within the waiting time. The controller combines the recorded infrared key values into a target infrared key value and responds to the target infrared key value. For example, in a channel switching context, the user selects the combined key of a remote controller, in this case, the controller controls a display to present a key interface, in this case, an interface presented on the display may refer to FIG. 10, the user selects a "control 1", and then sequentially selects a "control 2"; and a "control 5", and within 3 seconds after the user completes selection operation of the "control 5", the user does not continue to select other digital controls. The controller responds to the infrared key value "125", that is, the controller controls the display to be switched to a channel 125.

With further reference to FIG. 10, in some embodiments, the key sub-interface 104 of the digital drop-down control 102 may further include a confirmation control 106, and the controller is further configured to: generate a target infrared key value in response to a selection of the confirmation control from the user, the target infrared key value is associated with one or more digital controls selected by the user within a preset time, and the preset time takes selection of the digital control for the first time as a starting point and takes selection of the confirmation control as an ending point. For example, in a context of password entry, the user selects the integrated key of the remote controller, in this case, the controller controls the display to present a key interface, in this case, an interface presented the display may refer to FIG. 10, the user selects a control 1, and then sequentially selects a control 2, a control 5, and a control 9 and the confirmation control 106. When the user selects the confirmation control 106, the controller immediately generates an infrared key value corresponding to "1259".

With further reference to FIG. 10, in some embodiments, the key interface further includes a move control 107; and the controller is further configured to control the key interface to move in response to a selection of the move control from the user, so as to prevent the key interface from shielding other interfaces, and other interfaces may be but are not limited to an interface for playing content.

Figure 12:
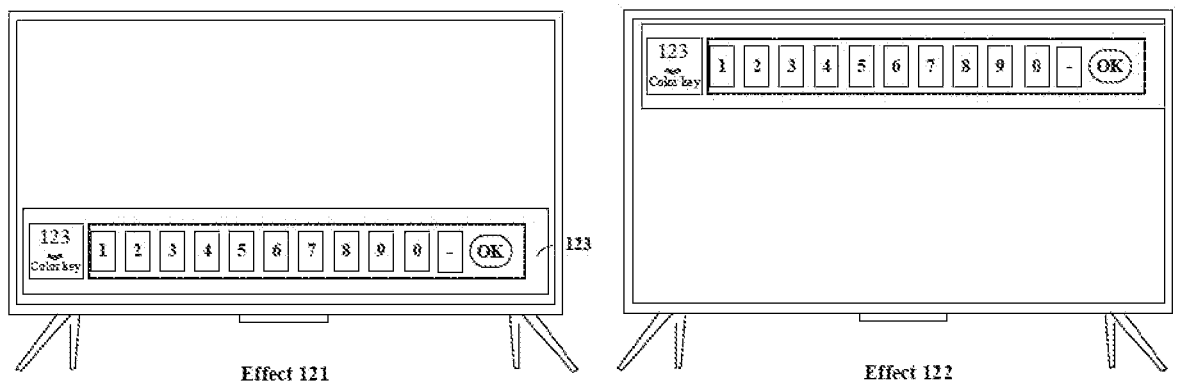
FIG. 12 is a schematic diagram of a variation of a display apparatus before and after movement of a key interface according to some embodiments.

A process of moving the key interface is described below with reference to specific drawings. FIG. 12 is a schematic diagram for show change before and after movement of a key interface in some embodiments. When the user selects a 123/colour key, a display of the display apparatus presents a key interface 123, and a default display position of the key interface in the embodiments is a bottom of the display, which may refer to an effect 121 in FIG. 12. In response to a selection of the move control from the user, the controller controls the key interface 123 to move to a top of the display, which may specifically refer to an effect 122 in FIG. 12.

The effect 121 in FIG. 12 only introduces a move control. In a process of practical application, the move control may be configured as a plurality of sub-controls, like four direction sub-control, each of the plurality of sub-controls corresponds to one direction, and the controller controls the key interface to move towards a direction corresponding to the sub-control in response to a selection of the sub-control from the user.

In some embodiments, the controller is further configured to: while the key interface is presenting on the display of the display apparatus, in response to a command for moving a focus, control the focus to move on the key interface.

In the embodiments, if the display displays the key interface, the key interface obtains the focus, the focus only moves between the controls on the key interface in response to a command for moving the focus, and when the focus moves to a boundary, if the command for moving the focus continues outputting, the focus does not cross the boundary (that is, the focus is moved from the key interface to another interface).

In response to a selection of the first control from the user, the controller is configured to: generate a target infrared key value (S83), the target infrared key value is a key value of an omitted key corresponding to the selected first control.

Generating the target infrared key value may include: in response to a selection of the first control from the user, a driving layer of the display apparatus checks a Map table to call a key value of the omitted key corresponding to the first control, where the Map table includes the first control and a key value of the omitted key corresponding to the first control.

Further, the controller is configured to: control the display to display a corresponding interface/make a corresponding response on the basis of an indication of the target infrared key value (S84).

For example, in a context of channel switching, if the target infrared key value is the infrared key value "125", the controller controls the display to be switched to a channel 125.

In some embodiments, if a controller determines that an infrared key value received via a infrared signal is a second infrared key value, the controller is configured to: control a display to present a corresponding interface/make a corresponding response on the basis of an indication of the second infrared key value (S85).

For example, in a shutdown context, if the second infrared key value is an infrared key value for "shutdown" of the display apparatus, the controller causes the display apparatus to shut down.

In the embodiments, the second infrared key value is different from the first infrared key value. The first infrared key value is an infrared key value output from the remote controller when the user selects the integrated key. The second infrared key value is an infrared key value output from the remote controller when the user selects a key other than the integrated key.

The display apparatus in the embodiments includes a controller, a display, and a remote controller. The remote controller integrates a plurality of keys into an integrated key, such that an overall size of the remote controller is reduced, and layout of keys on the remote controller is clear and definite. When the user selects the integrated key, the keys integrated (which may also be referred to as the omitted keys) may be presented on the display in a form of controls, and the controls presented on the display have the same function as the omitted keys.

The embodiments of the disclosure further provide a remote controller. The remote controller has a plurality of keys, one of the keys is an integrated key, the integrated key is configured for replacing at least two omitted keys, so as to reduce the number of the plurality of keys arranged on the remote controller, and the omitted keys are keys that are not arranged on the remote controller, the remote controller is configured to: output an infrared signal carrying a first infrared key value to a controller in response to a selection of the integrated key from a user, so as to make the controller to display a key interface, the key interface includes two first controls, each of the first controls uniquely corresponding to one of the omitted keys, and the at least first controls have a same function as the at least omitted keys.

According to the remote controller in the embodiments of the disclosure, the plurality of keys are integrated into one integrated key, such that an overall size of the remote controller is reduced, and key layout on the remote controller are clear and definite. When the user selects the integrated key, the keys integrated (which may also be referred to as the omitted keys) may be presented on the display in a form of controls, and the controls displayed on the display have the same function as the omitted keys.

Figure 13:
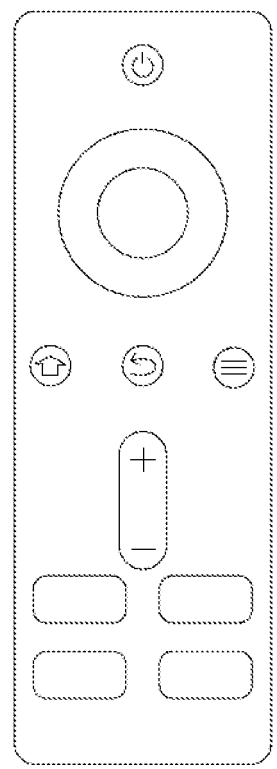
FIG. 13 is a schematic diagram of a remote controller according to some embodiments.

In some embodiments, a control device 100 such as a remote controller matching with a display apparatus 200 is generally provided with keys which may be customized. Generally, there are one or more keys, which may refer to a remote controller shown in FIG. 13 for details. 4 keys may be arranged at the bottom most of the remote controller. A user may customize associated contents or associated functions of the keys on the display apparatus 200 according to requirements of the user. For example, the user may configure the keys 1 to associate with an application A, such that when launching the application A, the user only needs to press the corresponding key 1.

The above mode for associating a key with a function on the control device 100 allows a user to operate the display apparatus 200 more conveniently. However, if the user wants to use such a function, the user needs to actively associate the corresponding keys in advance. If the number of applications (APPs) that may be configured on the display apparatus 200 is increased, the user needs to continuously manually perform association setting of different functions. It may be seen that an operation process of such association setting is tedious, which may affect user's experience.

The embodiments of the disclosure provide a display apparatus 200. The display apparatus 200 may actively recommend target applications that may be associated, so as to further avoid inconvenient operations.

The display apparatus 200 in the embodiments of the disclosure may display a page for prompting key association for the user when recommending the target applications that may be associated, and the page may prompt the user to associate the target applications with keys.

Figure 14:
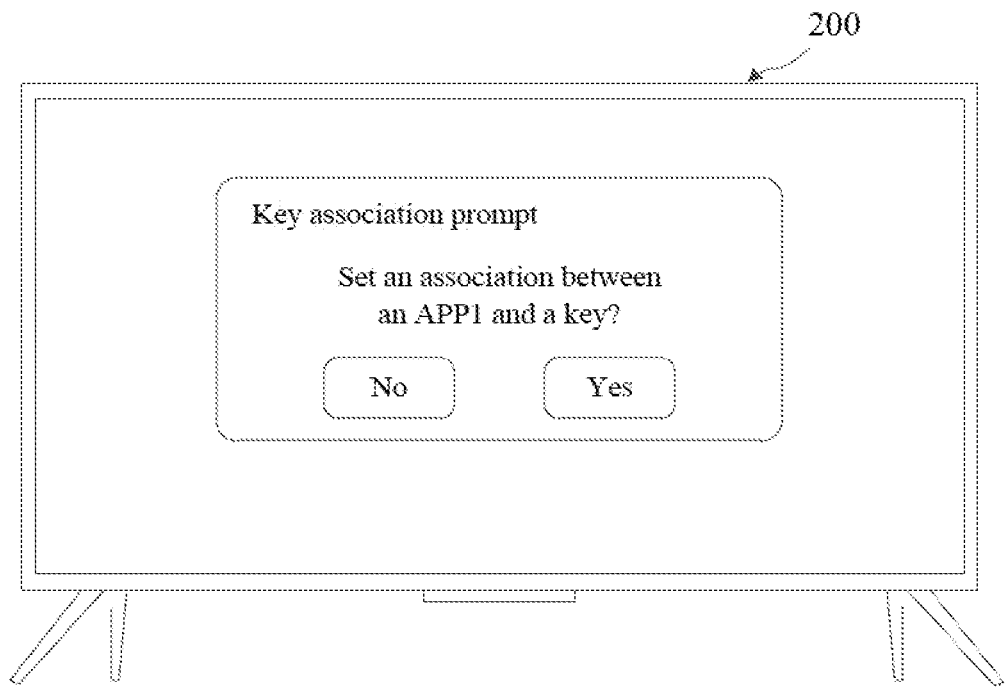
FIG. 14 is a schematic diagram of a prompt page for prompting key association on a display apparatus 200 according to some embodiments.

FIG. 14 is a schematic diagram of a prompt page for prompting key association on a display apparatus 200 according to some embodiments. As shown in FIG. 14, the prompt page may display an association prompt, for example, "Set an association between an APP and a key?" Moreover, "Yes" and "No" options are further displayed on the prompt page. After a user views the prompt page, if the user wants to associate the APP1 with a key, the user may select the "Yes" option on the prompt page; and if the user does not want the APP1 to associate with the key, the user may select the "No" option on the prompt page.

After the user selects the "Yes" option, the display apparatus 200 will continue to display a to-be-selected key page including several keys to be associated.

Figure 15:
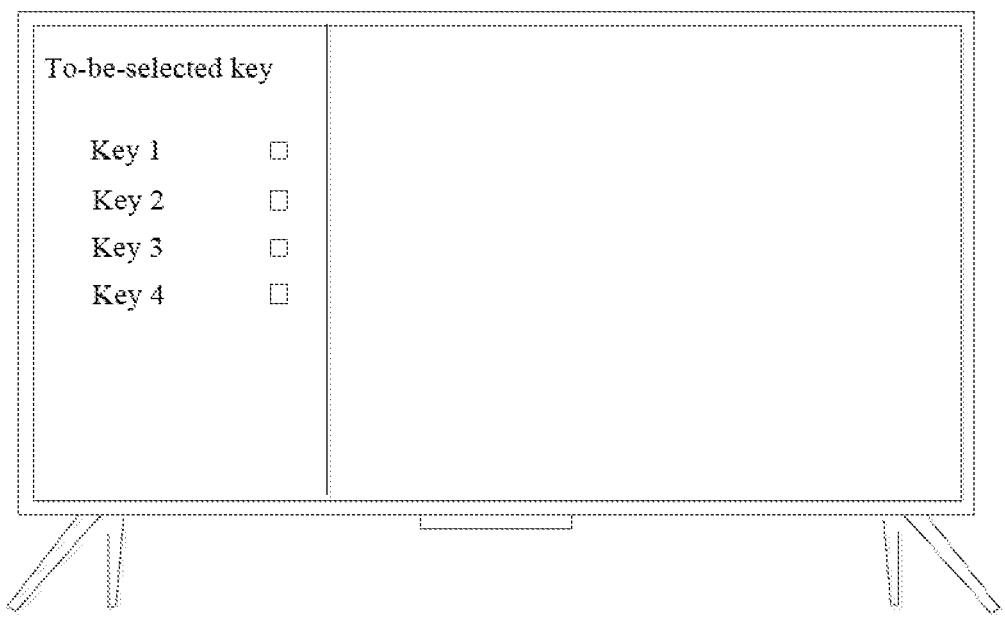
FIG. 15 is a schematic diagram of a page for presenting to-be-selected keys of a display apparatus 200 according to some embodiments.

FIG. 15 is a schematic diagram of a to-be-selected key page of a display apparatus 200 according to some embodiments. With reference to FIG. 15, options such as a key 1, a key 2, a key 3 and a key 4 may be displayed on the to-be-selected key page. A user may select a target key desired to be associated with the APP among four options. If the user selects the key 3, the display apparatus 200 associates the key 3 with the APP1, and thereafter, if the user wants to launch the APP1, the user may directly press the key 3 on a control device 100 without searching the APP1 in the display apparatus 200 for selection.

In some embodiments, a display apparatus 200 further displays a notification message for prompting the user to perform association in a message center. The message center of the display apparatus 200 is usually hidden, and only an entry to the message center is reserved on a current display page. After the user selects the entry, the user may control the display apparatus 200 to display a message page in the message center.

Figure 16:
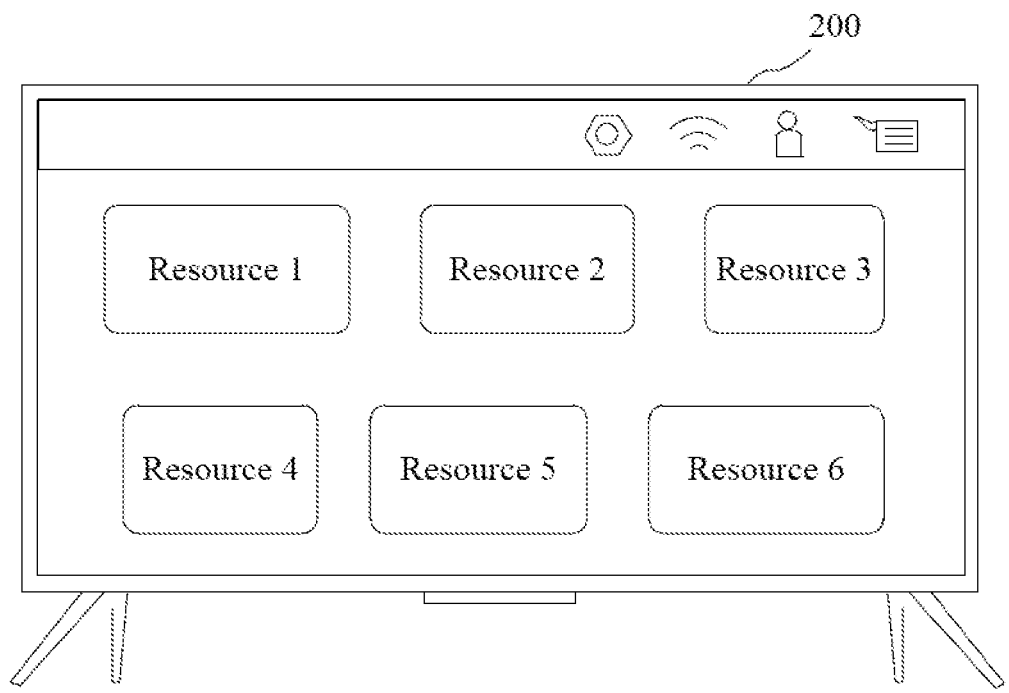
FIG. 16 is a schematic diagram of a display page in a display apparatus 200 according to some embodiments.

FIG. 16 is a schematic diagram of a display page in a display apparatus 200 according to some embodiments. With reference to FIG. 16, entries to setting, network, user, message, etc. are displayed on a taskbar at a top of a current display page. Different interfaces are represented by different icons. The entry to a message page is represented by the icon of the message bubble on the taskbar.

When a user selects the message entry on the display page, the display apparatus 200 further displays the message page of a message center. Message regions of different messages are displayed on the message page, where the message region displaying a notification message prompts the user to associate a target application with a key.

Figure 17:
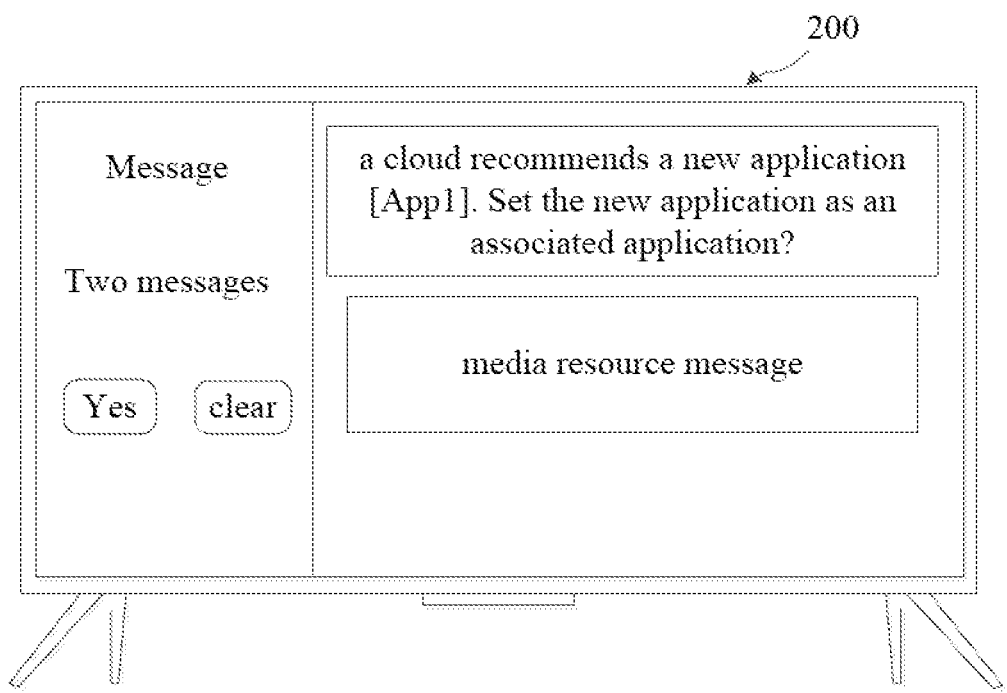
FIG. 17 is a schematic diagram of a message page of a display apparatus 200 according to some embodiments.

FIG. 17 is a schematic diagram of a message page in a display apparatus 200 according to some embodiments. With reference to FIG. 17, a notification message, a media resource message, etc. associated with keys are displayed on the message page. The notification message displays a prompt "a cloud recommends a new application [App 1]. Set the new application as an associated application? Press [OK] to set". If a user option associates the APP1 with a key, a display apparatus 200 may be controlled to display a key association prompt page only by pressing a "OK" key on a control device 100. Further, a user continues selecting a target key on the key association prompt page.

In the embodiments of the disclosure, after a target application is successfully associated with a key, the display apparatus 200 further displays an association success prompt page to prompt the user that the target application may be used by using the key.

Figure 18:
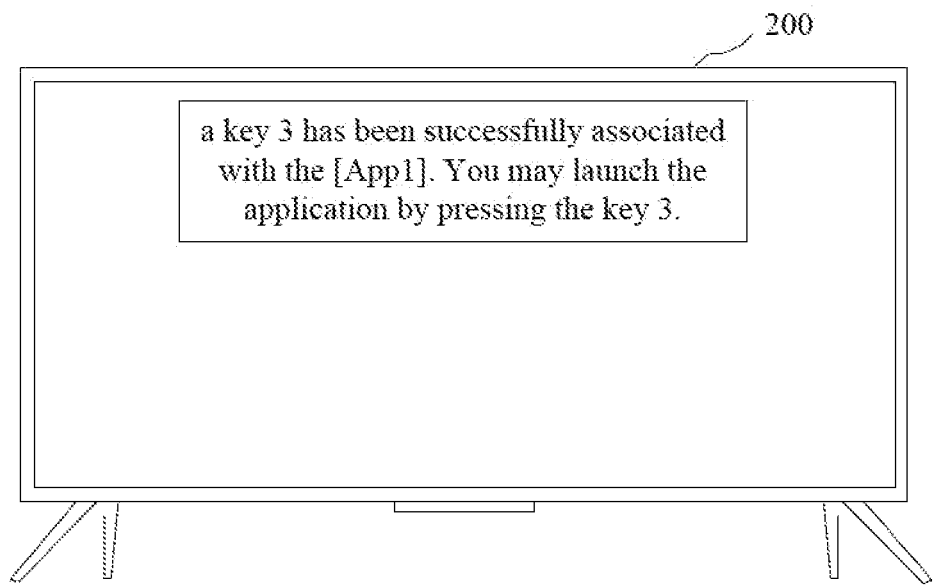
FIG. 18 is a schematic diagram of a prompt page for prompting successful association according to some embodiments.

FIG. 18 is a schematic diagram of a prompt page for prompting successful association according to some embodiments. With reference to FIG. 18, a prompt content displayed on the prompt page may be "a key 3 has been successfully associated with the [App1]. You may launch the application by pressing the key 3."

Figure 19:
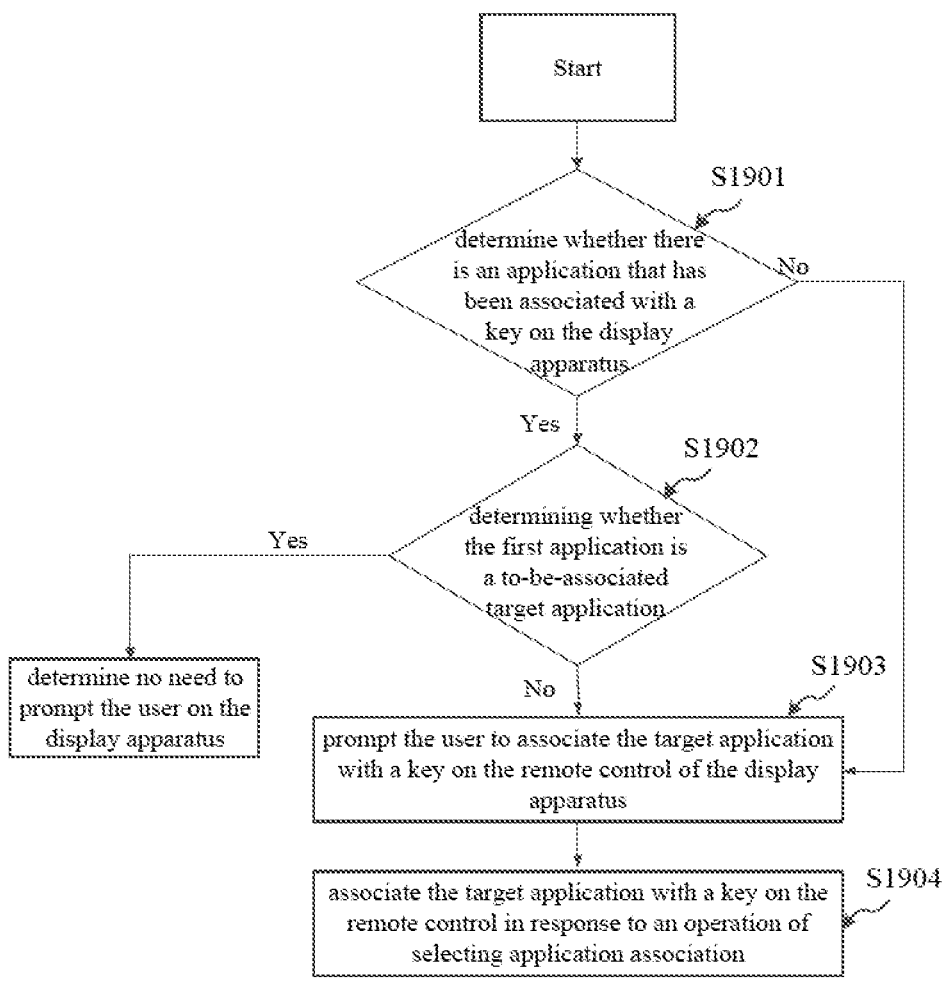
FIG. 19 is a flow diagram of a method for associating applications on a display apparatus according to some embodiments.

In view of the above issues, the embodiments of the disclosure further provide a method for associating applications on a display apparatus. The method may be applied to the display apparatus 200. As shown in FIG. 19, the method may include:

S1901, determining whether there is an application that has been associated with a key on the display apparatus 200.

In some embodiments, before S1901, a to-be-associated target application may be further obtained. In the embodiments of the disclosure, there are at least two methods to obtain the target application. One method is to obtain the target application by means of the display apparatus 200, and in this case, the display apparatus 200 may determine the target application according to a use situation of each of applications used by the user; and the other method is to obtain the target application by means of a server, and in this case, the server determines the target application according to an update situation of the applications on the display apparatus 200.

Figure 20:
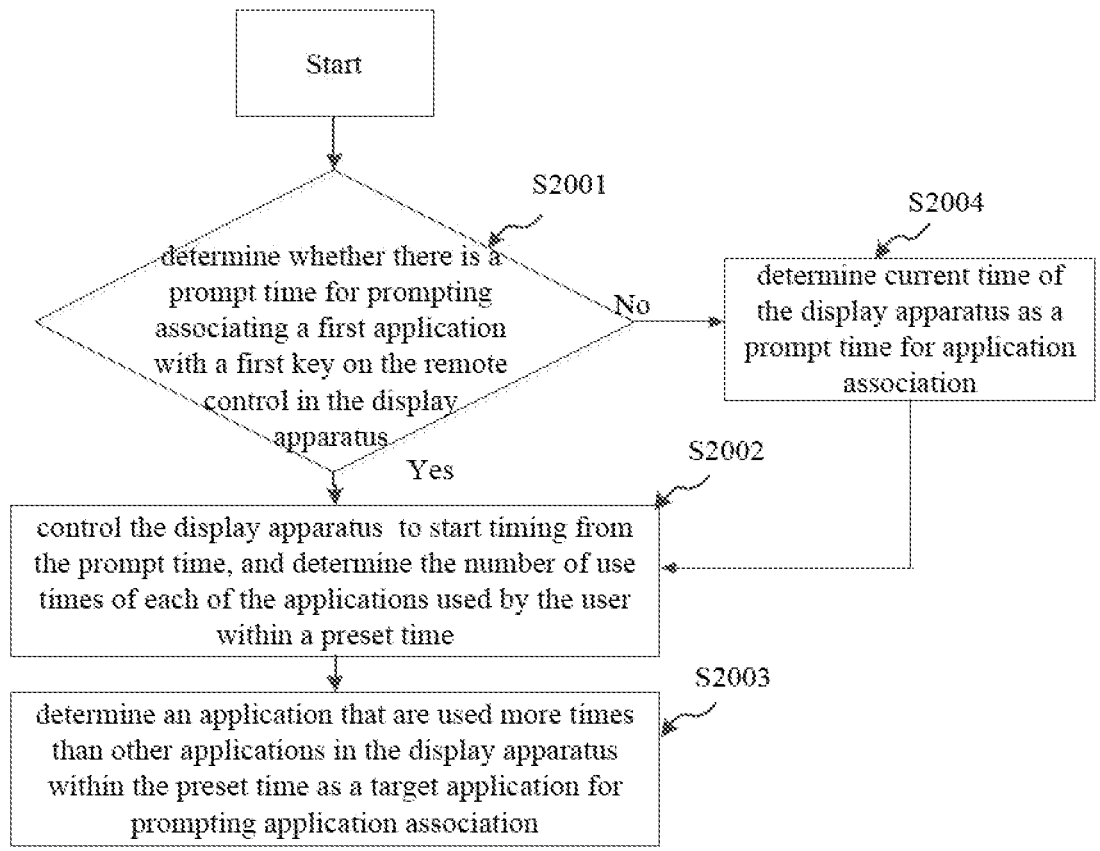
FIG. 20 is a flow diagram of obtaining a target application by a display apparatus 200 according to some embodiments.

When the target application is obtained by means of the display apparatus 200, as shown in FIG. 20, before S1901, S2001 may be firstly executed: determining whether there is a prompt time for prompting associating a first application with a first key on the remote controller in the display apparatus 200. The prompt time refers to a time point for starting timing, and the prompt time for association may be preset in the display apparatus 200 or may not be preset.

S2002, if there is a prompt time for prompting associating a first application with a first key in the display apparatus 200, controlling the display apparatus 200 to start timing from the prompt time, and determine the number of use times of each of the applications used by the user within a preset time. The first application may be an application in the display apparatus, and may include one or more applications that have been prompted to associate with one or more keys. The preset time refers to a period of time after the prompt time for association, such as 10 days, 30 days, 80 days, etc. If the prompt time is Sep. 15, 2021, and the preset time is 10 days, the display apparatus 200 needs to count the number of use times of each of the applications used by the user between September 15 and September 25.

S2003, determining an application that are used more times than other applications in the display apparatus within the preset time as a target application for prompting application association.

If the number of use times for APP1 in 10 days is 5 times, the number of use times for APP2 in 10 days is 2 times, the number of use times for APP3 in 10 days is 8 times, and the number of use times for APP4 in 10 days is 6 times, it may be seen that the APP3 is an application of which the number of use times are the most in 10 days, and it may be determined that the APP3 is the target application for association recommendation.

S2004, if there is no prompt time for application association in the display apparatus 200, determining current time of the display apparatus 200 as a prompt time for application association.

The current time of the display apparatus 200 may be a certain day or a specific time of a certain day. For example, the display apparatus 200 does not recommend application association before S2002, that is to say, the display apparatus does not have a prompt time for application association, and the current time of the display apparatus 200 is 10:28 on Sep. 15, 2021, then September 15 may be determined as a prompt time for application association for the first time, or 10:28 on September 15 may be determined as a prompt time for application association for the first time.

After the current time of the display apparatus 200 is determined as the prompt time, a time point for prompting associating an application with a key for the first time, a timing task from the prompt time is started, so as to determine the number of use times of an application within the preset time.

Figure 21:
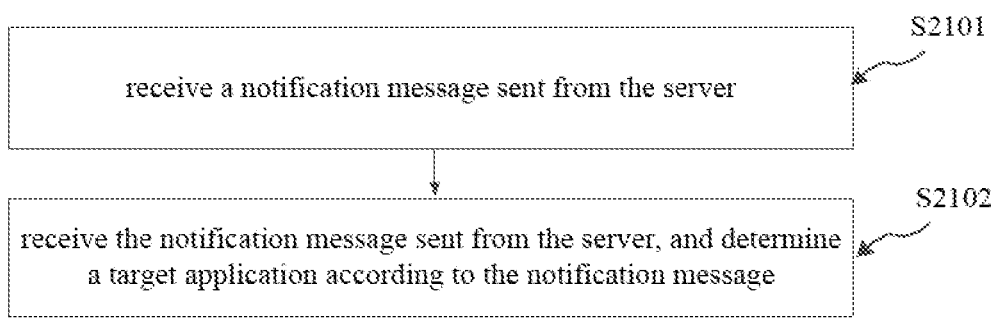
FIG. 21 is a flow diagram of obtaining a target application by a server according to some embodiments.

When the target application is obtained via the server, as shown in FIG. 21, before S1901, S2101 may be firstly executed: receiving a notification message sent from the server. The notification message is used for prompting the display apparatus 200 to associate a target application having a new function or a new version, with a key on the control device 100.

In the embodiments of the disclosure, installing status of an application on the display apparatus 200 is captured by the server in real time, and when the application needs to be updated or upgraded, the server notifies the display apparatus 200 to upgrade. Moreover, a new application needs to be installed on the display apparatus 200, and also needs to be obtained from the server. The server may obtain the latest updated or newly downloaded applications on the display apparatus 200, and notify the display apparatus 200 that the updated applications or the newly downloaded applications may be associated with the keys on the remote controller.

Since the updated applications or the applications having new versions generally have new functions or optimize some functions, the server recommends the display apparatus 200 to associate these applications with keys on the remote controller, which may further increase the exposure of the new functions or new services of the applications and increase the popularity of the applications.

S2102, receiving the notification message sent from the server, and determining a target application according to the notification message. In S2102, the target application is an application having a new function or a new version, which is determined by the server side.

In the above embodiments, after the target application is obtained, whether there is an application that has been associated with a key on the remote controller on the display apparatus 200 may be further determined.

S1902, if there is a first application that has been associated with a first key on the remote controller in the display apparatus 200, determining whether the first application is a to-be-associated target application.

In the embodiments of the disclosure, there may be one or more applications that have been associated with one or more keys on the remote controller in the display apparatus 200.

When there is only one application that has been associated with a key on the remote controller in the display apparatus 200, it is necessary to determine whether the application associated is the target application to be recommended for application association. For example, there is only one APP1 that has been associated with a key on the display apparatus 200, and the to-be-associated target application obtained by the display apparatus 200 is an APP4, and it is determined that the application that has been associated with a key on the display apparatus 200 is not the target application.

Alternatively, there is only one APP that has been associated with a key on the display apparatus 200, and the to-be-associated target application obtained by the display apparatus 200 is the APP1, such that it is determined that the application that has been associated with a key on the display apparatus 200 is the target application.

When there is more than one applications that have been associated with one or more keys on the remote controller 200, it may be determined whether there is a first application among the more than one applications associated with the one or more keys the same as the to-be-associated target application, if so, the first application may be considered as the target application, and if not, the more than one applications are determined as not the target application.

For example, the applications that have associated with keys on the display apparatus 200 are the APP1, an APP2 and an APP3, and the obtained to-be-associated target application is the APP4, it is determined that there is no target application APP4 in the applications associated with keys, and it is determined that the applications associated with the keys are not the target application.

Alternatively, the applications associated with keys on the display apparatus 200 are the APP, the APP2 and the APP3, and the obtained to-be-associated target application is the APP, such that it is determined that there is the target application APP1 in the applications associated with keys, and it is determined that one of the applications associated with the keys is the target application.

S1903, if the first application is not the target application, prompting the user to associate the target application with a key on the remote controller of the display apparatus.

In the embodiments of the disclosure, if the first application is not the target application, it indicates that the target application obtained by the display apparatus 200 is not currently associated with any key on the remote controller, and therefore, the user may be prompted to associate the target application with a key on remote controller of the display apparatus 200.

In addition, after S1901, if it is determined that there is no application that has associated with a key on the remote controller of the display apparatus 200, it indicates that all applications including the target application on the display apparatus 200 are not associated with a key on the remote controller, and in this case, the user may also be prompted to associate the target application with a key on the remote controller of the display apparatus 200.

It may be seen from the above that when the display apparatus 200 prompts the user to perform an association operation, a prompt page for prompting specific key association with an application may be displayed. Therefore, in S1903, if the first application is not the target application, the controller is further controlled to display a prompt page for prompting associating an application with a key on the remote controller. The prompt page, which is shown in FIG. 14, is used for prompting the user to associate the target application with a key on the remote controller, and the prompt page further provides a set option and a cancel option for the prompt of the application association.

After S1902, if it is determined that the first application is the to-be-associated target application, it indicates that the target application on the display apparatus 200 has been associated with a key on the remote controller, and the target application does not need to be associated again, and there is no need to prompt the user on the display apparatus 200.

S1904, associating the target application with a key on the remote controller in response to an operation of selecting application association.

In S1904, if the user selects the set option on the prompt page, the display 260 is controlled to display a to-be-selected key page in response to the operation of selecting the set option. The to-be-selected key page is shown in FIG. 15, which is used for displaying several to-be-selected keys that correspond to one or more keys available on the remote controller for association with the target application.

In S1904, if the user selects a target key on the to-be-selected key page, in response to a selection of the target key, the target application is associated with the target key on the remote controller.

It should be noted that the selection from the user includes an operation of inputting a command to the display apparatus 200 or a selection operation on the touch screen of the display apparatus 200. The command from the user may be a command issued by pressing a key on the control device 100 such as the remote controller, or may be a voice command.

In some embodiments, if the target application is obtained by the display apparatus 200 from the server, the notification message sent from the server may be further displayed in the message center of the display apparatus 200 when one of the applications associated with keys on the display apparatus 200 are not the target application. A message page of the message center is shown in FIG. 17. In S1904, if the user selects the message center on the display page of the display apparatus 200, the controller is controlled to display the message page in response to a user input for selecting the message center. The message page displays several system messages or messages sent from the server side. In S1904, when the user selects the notification message on the message page, the controller is controlled to present a prompt page for prompting application association with keys in response to a user input for selecting the notification message.

In some embodiments, a new application is launched on a server side, but the new application has not been installed on a display apparatus 200. When the server sends the new application to the display apparatus, the server also carries information for recommending the new application for association with a key on the remote controller. After the application is downloaded and installed, the display apparatus 200 may directly display the prompt page for application association to a user to ask whether the newly installed application is needed to associate with a key on the remote controller.

Figure 22:
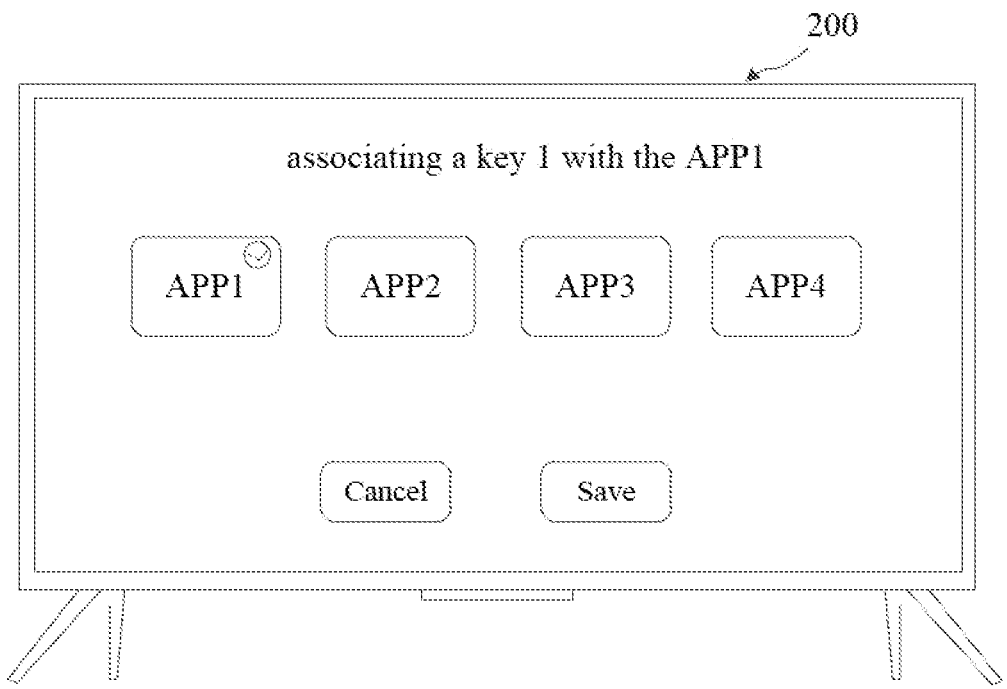
FIG. 22 is a schematic diagram of a to-be-selected application page of a display apparatus 200 according to some embodiments.

In some embodiments, there may be more than one to-be-associated target application on a display apparatus 200, and in this case, the display apparatus 200 may further provide a to-be-selected application page for the user. FIG. 22 is a schematic diagram of a to-be-selected application page of a display apparatus 200 according to some embodiments. As shown in FIG. 22, several to-be-selected target applications, such as an APP1, an APP2, an APP3 and an APP4, may be displayed in the to-be-selected application page, and a prompt of "associating a key 1 with the APP1" is displayed when a focus lands on the APP1 option. A cancel option and a save option are further displayed at a bottom of a to-be-selected application page. If the user moves the focus to the APP1 option and inputs a confirmation instruction, and then moves the focus to the save option and inputs a confirmation instruction, the display apparatus 200 will save user's association configuration to associate the APP1 with the key 1. If the user moves the focus to the APP1 option and inputs a confirmation instruction, and then moves the focus to the cancel option, the display apparatus 200 will not save current association configuration of the user, and the APP1 is still in an unassociated state or an original associated state.

There may be more than one key on the control device 100, and therefore, when the display apparatus 200 obtains more than one target application, the display apparatus 200 may firstly display a to-be-selected key page to the user, and then display a to-be-selected application page for associating a target key after the user selects the target key.

Figure 23:
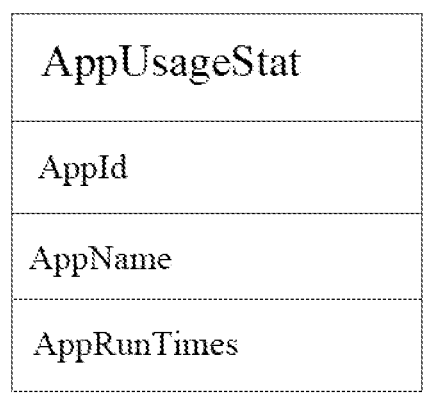
FIG. 23 is a schematic diagram of application use statistics according to some embodiments.

In some embodiments, the above process of utilizing the prompt time for application association and the preset time to count the number of use times of the applications may further be implemented by configuring an application usage statistics (AppUsageStat). The AppUsageStat, which refers to FIG. 23, is used for recording the number of use times of an application, where AppId field represents an identity of an application, and AppIds of different applications are different; an application name (AppName) field is a name of the application; and application running rimes (AppRunTimes) field is the number of use times of the application. When launching the application, the display apparatus 200 needs to find the record of the application from the AppUsageStat according to AppId information of the launched application, and add 1 to data in the AppRunTimes field in the record to count use times of the application.

Moreover, the display apparatus 200 may further include a timer, and the timer starts counting from the prompt time for application association until a preset time period.

The method for associating applications with keys on the remote controller of a display apparatus in the embodiments of the disclosure may actively prompt the user to associate a key with a target application, and provide related pages of association setting for the user. The user may control the display apparatus to associate the target application with the key, and then, when the user wants to use the target application, the user only needs to press the corresponding key on the control device without searching it through multiple operations. It may be seen that the above method of the disclosure may automatically recommend the applications which may be associated with keys to the user, thereby avoiding a plurality of complex setting operations, improving user's experience.

In some embodiments, the display apparatus 200 in the embodiments of the disclosure may not only actively recommend the target applications that may be associated with keys on the remote controller to the user, but also provide a setting entry for the user to manually set the content associated with the key. When the display apparatus 200 does not recommend the target application to the user, the user may find the setting page for application association with keys on the remote controller via the system setting on the display apparatus 200, and select a target key and a target application associated with the target key on a setting page.

The method for associating applications with keys on a remote controller in the embodiments of the disclosure may be applied to the display apparatus 200 in the above embodiments and is implemented by the controller 250 of the display apparatus 200.

In some embodiments, after a display apparatus is started, a display interface of a signal source selected last time or a signal source selection interface may be directly shown, the signal source may be a preset video-on-demand application, and may also be at least one of an HDMI interface, a live broadcast interface, etc., and after a user selects a signal source, a display may present contents obtained from that signal source.

In order to satisfy user's requirements, browser applications are installed on some display apparatus. Due to a display size of the display apparatus, browsing experience (such as reading text, viewing pictures, playing videos, etc.) utilizing the display apparatus is superior to that of portable devices such as mobile phones and computers. However, in terms of operation experience, the browsing experience of the display apparatus is not as convenient as that of the portable devices. A remote controller of the display apparatus does not have a rolling wheel function, when a user needs to scroll a webpage upwards or downwards, the user may only move the focus to an edge of the display by pressing a corresponding direction key for a long time or continuously pressing a corresponding direction key, and then the user continues to press the direction key for a long time or continuous to press the direction key to achieve the purpose of moving the webpage, resulting in poor user experience.

In order to the above issue, the embodiments further improve the display apparatus. The display apparatus at least includes: a controller, a display and a remote controller.

In the disclosure, the display is used for displaying content on an interface. The interface may display different contents in different scenarios. A content displayed on the interface may be, but not limited to, boot animation, media resources and system homepage. For example, in a starting process of the display apparatus, the interface may show the boot animation; and the display apparatus completes preparation work of startup, and the interface skips from the boot animation to the system homepage. In the embodiments of the disclosure, a display content of the system homepage is not limited.

In the disclosure, the remote controller is provided with a plurality of keys. The remote controller is configured to output key events in response to a selection of a key on the remote controller from a user, and the key event may be transmitted between the remote controller and the controller in a foam of infrared signals. In the embodiments, at least one key of the remote controller is defined as a preset key. When the controller is in a first mode, the controller may control a content presented on the display to display in a scrolling manner in response to a selection of the preset key on the remote controller from the user. For example, one key may be additionally arranged on the remote controller to be used as the preset key, or an original key on the remote controller may be defined as the preset key. For example, a confirm key may be defined as the preset key.

A channel adjustment key may be used as the preset key. The design of the remote controller is increasingly more simplified, but channel switching is the most basic function of the display apparatus, the corresponding channel adjustment keys are not likely to be removed from the remote controller in a short time, and no special response is made to associated with the channel adjustment keys in a browser context, such that the channel adjustment keys are suitable as the preset key in embodiments of the disclosure.

Figure 24:
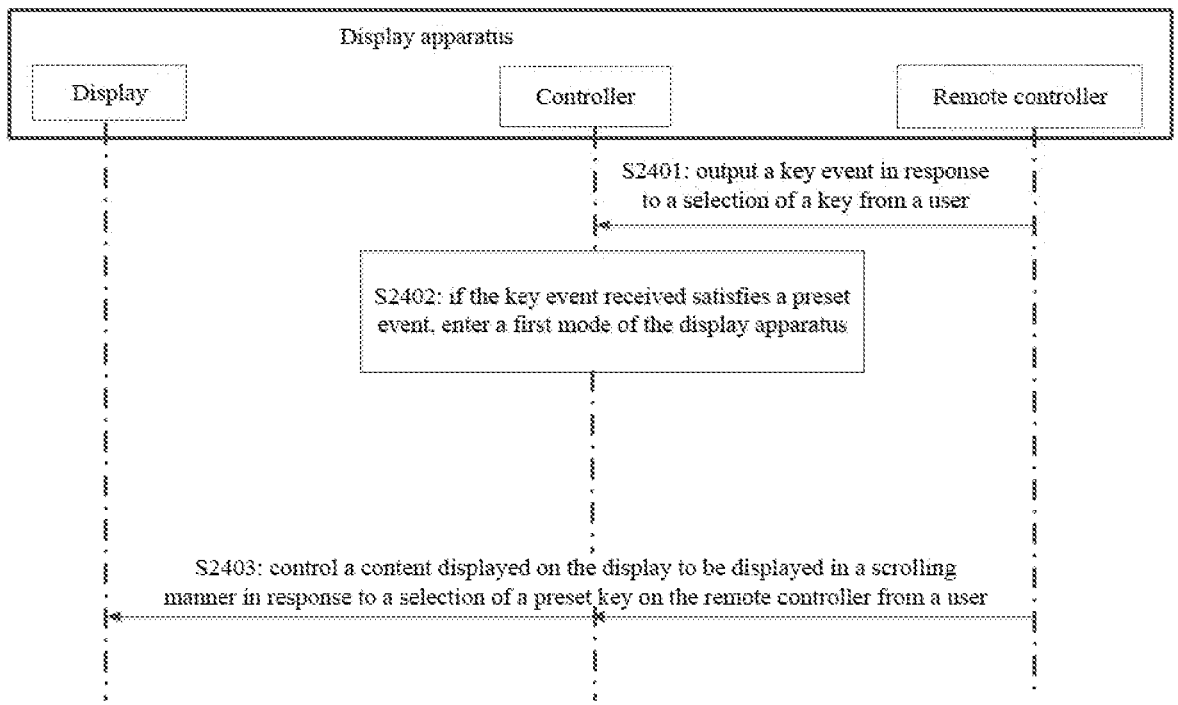
FIG. 24 is a flow diagram of interaction of components of a display apparatus according to some embodiments.

Operation of the display apparatus is described below with reference to specific drawings: FIG. 24 is a flow diagram of components interaction in a display apparatus shown in some embodiments:

a remote controller is configured to execute S2401: outputting a key event in response to a selection of a key from a user; and a controller of the display apparatus is configured to execute S2402: if the key event received satisfies a preset event, entering a first mode of the display apparatus.

In the embodiments of the disclosure, the display apparatus has two modes: a first mode and a second mode. In general, the controller is in the second mode, and the controller is switched from the second mode to the first mode only in a scenario where a content displayed on the display is moved in a scrolling manner.

In the second mode, the controller normally responds to a key event from the remote controller, that is, the controller responds with an original function associated with that key event. For example, when a channel switching key event is received, the controller controls the display to display a corresponding channel. For another example, when a sound adjustment key event is received the controller controls a loudspeaker to adjust a magnitude of an output audio signal.

In the first mode, the user may also control the content displayed on the display to be displayed in a scrolling manner by selecting the preset key on the remote controller. In some embodiments, a content presented on a display may be a content from a website via a browser in the display apparatus.

For example, in some embodiments, a preset key is a channel adjustment key on a remote controller. In a second mode, the controller controls the display to be switched to a corresponding channel in response to a selection of the channel adjustment key from a user. In a first mode, a content displayed on the display is controlled to be displayed in a scrolling manner in response to a selection of the channel adjustment key from the user.

In this example, the preset events may be set according to requirements. For example, it may be set that in a scenario where a certain key on the remote controller is being selected or pressed for a long time, the key event output from the remote controller may be a preset event. A certain key may be the preset key in the above embodiments, or may be other keys other than the preset key. For another example, in some embodiments, it may be set that the key event output from the remote controller is the preset event in a scenario where a certain key of the remote controller is pressed or selected continuously.

Figure 25:
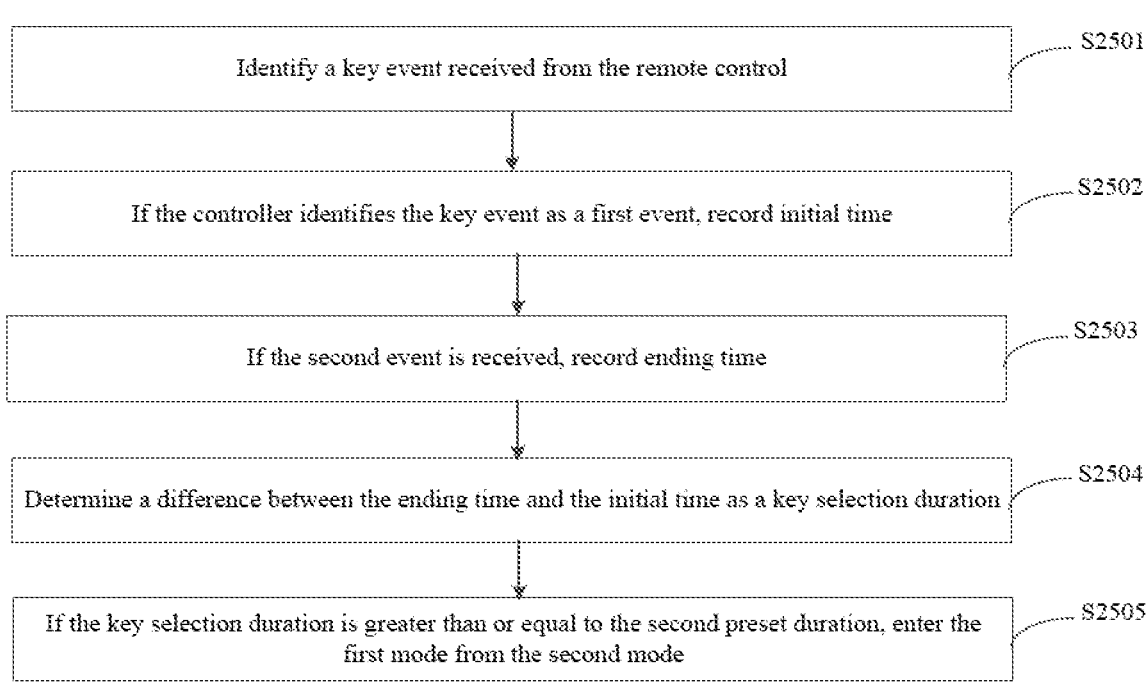
FIG. 25 is a first flow diagram for determining whether a key event received satisfies a preset event according to some embodiments.

In the embodiments of the disclosure, there are various implementations for determining that the key event received satisfies the preset event. FIG. 25 is a flow diagram for determining whether a key event received satisfies a preset event according to some embodiments. In a second mode, the controller is further configured to execute S2501-S2505.

S2501: identifying a key event received from the remote controller.

S2502: if the controller identifies the key event as a first event, recording an initial time.

In the embodiments, the first event is a key event output from the remote controller when selection time of the preset key is greater than a first preset duration, and the initial time is a time point when the first event is received for the first time, where the first preset duration may be set according to requirements, for example, the first preset duration may be 1 second.

Duration of the selection of the preset key on the remote controller is different, and the corresponding key event output from the remote controller is different. The remote controller outputs the first event when the duration of selection of the preset key is greater than the first preset duration. After the remote controller outputs the first event, time is counted by taking time of outputting the first event as a starting point, the first event is output again from the remote controller when the time reaches the first preset duration once again, and so on until a second event is output.

S2503: If the second event is received, recording an ending time.

In the embodiments of the disclosure, the second event is different from the first event. In a scenario where the preset key is pressed for a long time (that is, pressing duration is greater than the first preset duration), when another key other than the preset key is pressed, the key event output from the remote controller may be referred to as the second event. Alternatively, time is counted by taking time of outputting the first event as a starting point, when the time does not reach the first preset duration, the preset key is released, and in this case, the key event output from the remote controller may also be referred to as the second event.

In the embodiments of the disclosure, the ending time is a time point when the second event is received for the first time after the first event is received; and the controller is configured to execute S2504: determining a difference between the ending time and the initial time as a key selection duration.

S2505: if the key selection duration is greater than or equal to the second preset duration, entering the first mode from the second mode.

The second preset duration may be set according to requirements. For example, the second preset duration may be equal to 3 seconds.

The above process is described below with reference to specific examples.

In some embodiments, the first preset duration is 30 ms, the second preset duration is equal to 3 s, and the preset key is a down direction key. The user selects the down key, and when duration of selection of the down key is 30 ins, the remote controller outputs the first event to the controller. The controller records the initial time Tstart=T0 when receiving the first event. The remote controller counts time by taking T0 as the starting point, and when the counted time reaches 30 ms, the remote controller outputs the first event to the controller again, and moreover, the remote controller records a time (which may be represented by Tmiddle in the embodiments); and the remote controller counts time by taking the Tmiddle as the starting point, when the time reaches 30 ins, the remote controller outputs the first event to the controller one more time, and moreover, the remote controller records one Tmiddle, and so on until the remote controller outputs a second event. The controller records the ending time Tend when receiving the second event. The controller computes Tlong according to the following formula: Tlug=Tend−Tstart, where Tlong is key selection duration, and if Tlong is greater than or equal to T (the second preset duration is 3s), the controller enters the first mode from the second mode.

It should be noted that the time when the first event is received for the first time is taken as starting time in the above embodiments, and therefore it is equivalent to computing a first preset duration less in the process of determining the key selection duration. In order to ensure accuracy of the key selection duration, in some embodiments, the key selection duration may be determined by using the following formula: Tlong=Tend−Tstart+first preset duration.

Figure 26:
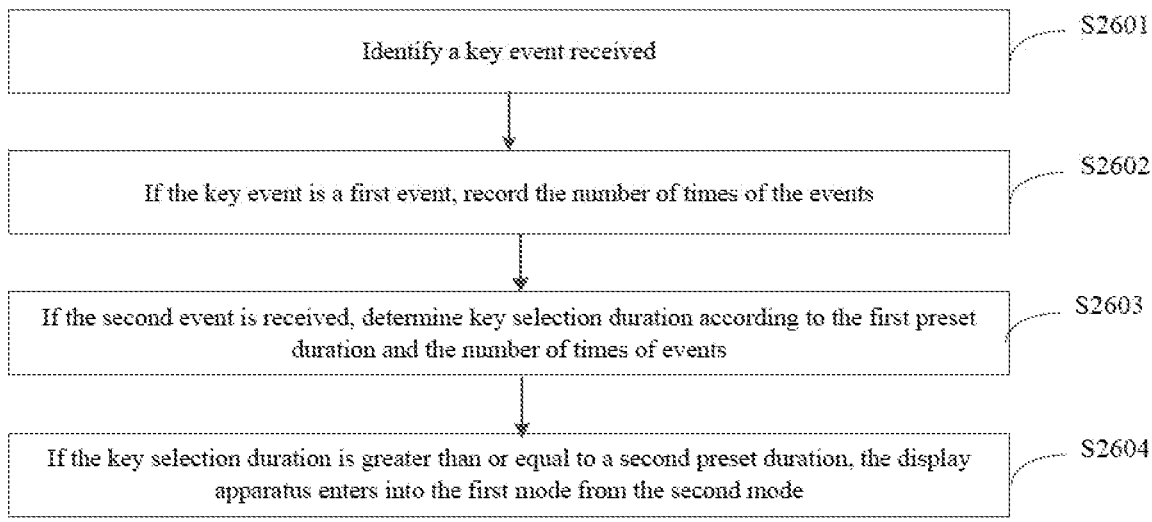
FIG. 26 is a second flow diagram for determining whether a key event received satisfies a preset event according to some embodiments.

FIG. 26 is another flow diagram for determining whether a key event received satisfies a preset event according to some embodiments. In a second mode, the controller is further configured to execute S2601-S2604:

identifying a key event received (S2601).

If the key event is a first event, recording the number of times of the events (S2602).

In the embodiment of the disclosure, the first event is a key event output from the remote controller when the duration for selection of the preset key is greater than the first preset duration, and the remote controller reports the first event once at an interval of the first preset duration when the preset key is selected continuously.

In the embodiments of the disclosure, each time the controller receives the first event, the corresponding recorded number of times of events is incremented by 1.

If the second event is received, determining key selection duration according to the first preset duration and the number of times of events (S2603).

In the embodiments of the disclosure, the key selection duration may be computed by using the following formula: Tlong=first preset duration*the number of times of events.

If the key selection duration is greater than or equal to a second preset duration, the display apparatus enters into the first mode from the second mode (S2604).

The above process is described below with reference to specific examples.

In some embodiments, the first preset duration is 30 ins, the second preset duration is equal to 3 s, and the preset key is a down direction key. The user selects the down key, and when duration of selection of the down key is 30 ms, the remote controller outputs the first event to the controller. The corresponding time when the controller receives the first event is Tmiddle, and the number of times of events is recorded as Nmulti=1. The remote controller counts time by taking Tmiddle as a starting point, and when the time reaches 30 ms, the remote controller outputs the first event to the controller one more time. When the controller receives the first event one more time, the number of times of events is updated: Nmulti (new)=Nmulti+1. Time Tmiddle is recorded when the remote controller outputs the first event to the controller; and the remote controller counts time by taking Tmiddle as a starting point, and when the time reaches 30 ms, the remote controller outputs the first event to the controller one more time. When the controller receives the first event again, the number of times of events is updated to Nmulti (new)=Nmulti+1, and so on until the second event is output from the remote controller. When receiving the second event, the controller performs computation by using the following formula: Tlong=first preset duration*Nmulti (new). If Tlong is greater than or equal to T (3s), the controller enters the first mode from the second mode.

Figure 27:
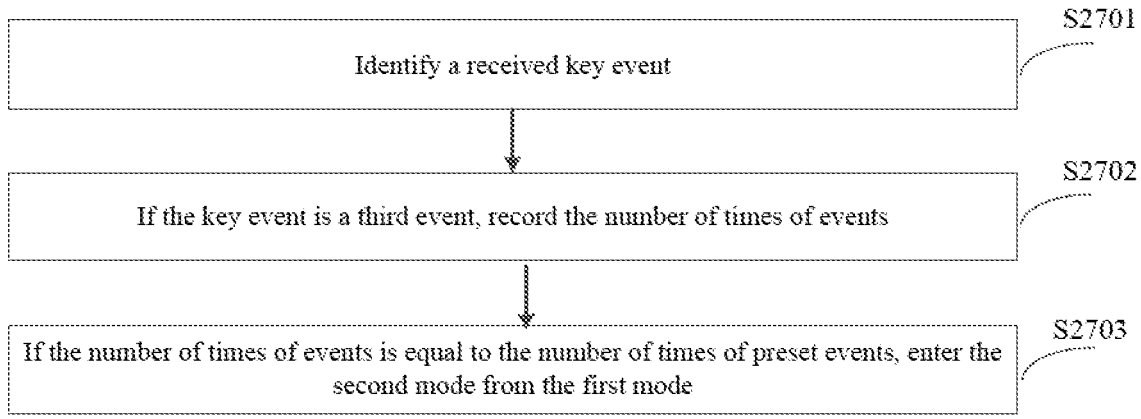
FIG. 27 is a third flow diagram for determining whether a key event received satisfies a preset event according to some embodiments.

FIG. 27 is another flow diagram for determining whether a key event received satisfies a preset event according to some embodiments. In a second mode, the controller is further configured to execute S2701-S2703:

identifying a received key event (S2701).

If the key event is a third event, recording the number of times of events (S2702).

In the embodiments of the disclosure, the third event is a key event output from the remote controller when the user selects the preset key; and it should be noted that, in this embodiment, the remote controller does not count selection time of the preset key, and as long as the preset key is being selected, the corresponding remote controller will report one third event to the controller.

In the embodiments of disclosure, each time the controller receives the third event, the corresponding recorded number of times of events is incremented by 1.

If the number of times of events is equal to the number of times of preset events, entering the second mode from the first mode (S2703).

The above process is described below with reference to specific examples.

In some embodiments, the number of times of preset events is 10, and a preset key is a down direction key. A user selects the down key, and the remote controller outputs a third event to the controller. When the controller receives the third event, the number of times of events is recorded as Nmulti=1. When the user selects the preset key one more time the remote controller outputs the third event to the controller one or more time. When the controller receives the third event one more time, the number of times of events is updated to Nmulti (new)=Nmulti+1, and so on until the number of times of events counted by the controller is equal to 10.

In some embodiments, in a process of counting (recording) the number of times of events, if the key event received is not the third event, the controller adjusts the number of events to be 0.

In some embodiments, the number of times of preset events is 10, and a preset key is a down direction key. A user selects the down direction key, and the remote controller outputs a third event to the controller. When the controller receives the third event, the number of times of events is recorded as Nmulti=1. Before Nmulti=10, if the key event received by the controller is not the third key event, the controller adjusts Nmulti to 0.

In some embodiments, a controller enters a first mode from a second mode in response to a selection of a shortcut key from a user, where the shortcut key may be, but not limited to, a colour key on a remote controller. For example, the shortcut key may be a red color key.

In the first mode, the controller is configured to: control a content displayed on the display to be displayed in a scrolling manner in response to a selection of a preset key on the remote controller from a user (S2403).

In the embodiments of the disclosure, the content presented on the display is displayed in a scrolling manner may be, but not limited to, the content displayed on the display being continuously displayed downwards at a predefined rate. A rate of displaying the content may be set by the user. The content displayed in a scrolling manner may include displaying the content on the display as a page and updating the page at a time interval.

The embodiments of the disclosure further provide a display apparatus. The display apparatus at least includes a display, a remote controller and a controller. When a user utilizes the display apparatus to browse a webpage, a key event satisfying a preset event may be output from the remote controller, so as to make the display apparatus (the controller of the display apparatus) enter a first mode from a second mode. In response to selection of the preset key on the remote controller in the first mode, the controller may control the content displayed on the display to be displayed in a scrolling manner, such that the content displayed on the display is rapidly scrolled, and the user experience is excellent.

The effects of the embodiments will be further described below with reference to specific examples: the user needs to repeatedly view and compare two paragraphs of text on the webpage, but the two paragraphs of text just may not be displayed on the same screen, and the user needs to repeatedly and alternately scroll up and down. According to a conventional method (in the embodiments of the disclosure, it is assumed that a window height of the television browser is 1080 px), an event report interval (which may be referred to as the first preset duration in the embodiments) when a key is pressed for a long time is 100 ms, a controller controls a step length of movement of a virtual mouse (a step length of movement of a virtual mouse in the embodiments may be considered as a step length of text movement in the webpage) to be 50 px each time the key is pressed, and time required for a single full-screen movement in a vertical direction is:

$T=(1080 \text{ px}/50 \text{ px})/(1000 \text{ ms/s}/100 \text{ ms})=2.16 \text{ s}.$ In this scenario, it takes about 4.3 seconds for the user to alternately scroll once (including one-time downward scrolling and one-time upward scrolling); if the user needs to alternately scroll for 10 times, it takes at least 43 seconds; and if the user uses a continuous key instead of a long key, at least 400 times of keys are needed to complete the same purpose. After a method for operating a television browser to rapidly scroll a webpage by keys on a remote controller is used, the user only needs to press the keys for 20 times (in this embodiment, the preset keys need to be selected twice for alternately scrolling once) in the same scenario to achieve the purpose, thereby reducing about 95% of the number of times of events.

In a practical process, the browser on the display apparatus supports webpage zooming, and most of zoomed web pages also have scrolling requirements in a horizontal direction. In order to make the display apparatus support scrolling in the horizontal direction, it is necessary to configure at least two groups of preset keys on the remote controller, where one group of preset keys may control the content displayed on the browser to scroll in a horizontal direction, and the other group of preset keys may control the content displayed on the browser to scroll in a vertical direction.

In some embodiments, a preset key may be defined as a channel adjustment key and/or a sound adjustment key on the remote controller. The channel adjustment key may control a content displayed on a browser to scroll in a horizontal direction, and the sound adjustment key may control the content displayed on the browser to scroll in a vertical direction. Alternatively, the channel adjustment key may control a content displayed on the browser to scroll in a vertical direction, and the sound adjustment key may control a content displayed on the browser to scroll in a horizontal direction.

Figure 28:
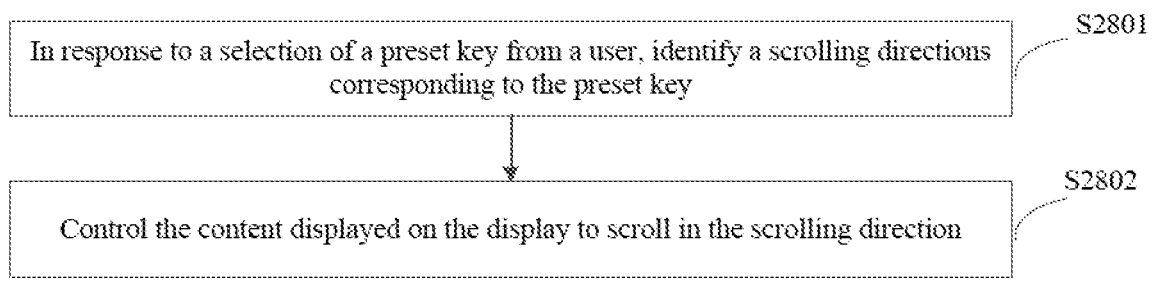
FIG. 28 is a flow diagram for controlling a content presented on a display to scroll in different directions according to some embodiments.

An implementation of controlling a content displayed on a display to scroll in different directions is described below with reference to specific drawings. FIG. 28 is a flow diagram for controlling a content displayed on a display to scroll in different directions in some embodiments. In the first mode, the controller is further configured to execute S2801 and S2802.

In response to a selection of a preset key from a user, identifying a scrolling directions corresponding to the preset key (S2801).

In the embodiments, the preset key corresponds to a scrolling direction. The scrolling direction corresponding to the preset key may be configured according to requirements. For example, a scrolling direction corresponding to an upward channel adjustment key is upward scrolling, a scrolling direction corresponding to a downward channel adjustment key is downward scrolling; a scrolling direction corresponding to a sound increase adjustment key is leftward scrolling; and a scrolling direction corresponding to a sound reduction adjustment key is rightward scrolling.

Controlling the content displayed on the display to scroll in the scrolling direction (S2802).

The disclosure may control the content displayed on the display to scroll in the horizontal direction or the vertical direction, such that the user experience is excellent.

The display apparatus shown in the embodiments may control the content displayed via the browser to scroll in the horizontal direction or the vertical direction, which is a newly added function, and some users may not enjoy convenience brought by the function because the users do not know usage rules of the function. In view of this issue, the embodiments further optimize the above display apparatus. Specifically, the controller is further configured to: control the display to display a prompt interface in response to a key event received satisfying a preset event, where the prompt interface is used for reminding a user to control the content on the display to be displayed in a scrolling manner by selecting a preset key.

Figure 29:
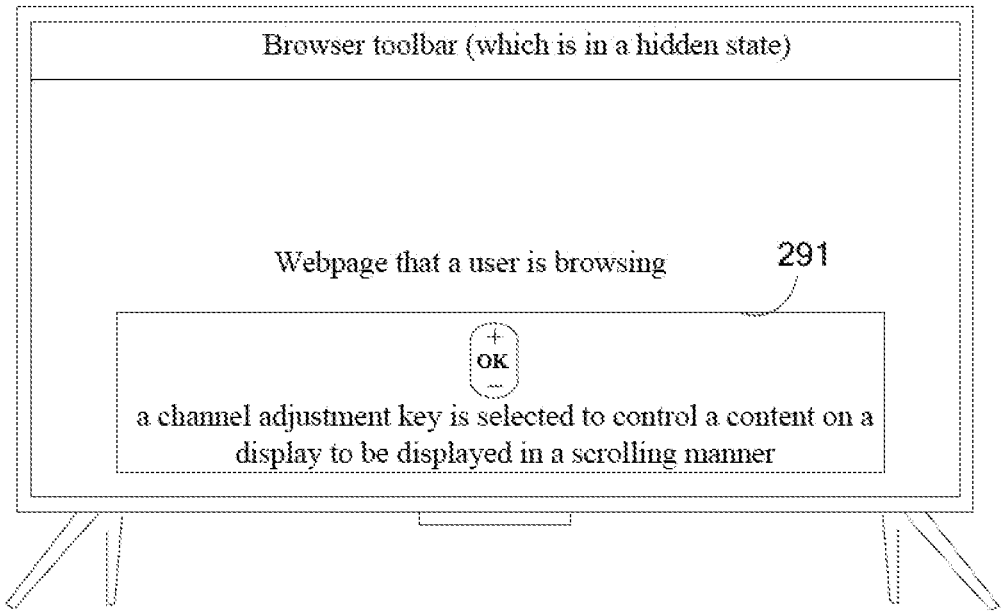
FIG. 29 is a schematic diagram of a display apparatus according to some embodiments.

The prompt interface will be described below with reference to specific drawings. FIG. 29 is a schematic diagram of a display apparatus provided in some embodiments. In the embodiments, the display of the display apparatus displays a prompt interface 291, and a content displayed in the prompt interface in the embodiments is "a channel adjustment key is selected to control a content on a display to be displayed in a scrolling manner". It should be noted that FIG. 29 only illustrates a content displayed by the prompt interface.

In the embodiments of the disclosure, the prompt interface may be, but not limited to, a Notification, a pop-up window, etc. for display. In order to reduce shielding of an effective page content as much as possible, in some embodiments, a prompt interface may be arranged in a lower right corner of a display.

In some embodiments, in order to prevent a prompt interface from being displayed for a long time to affect the effective page content, a controller may count display time of the prompt page, and when display time reaches a threshold value, the controller controls the display to cancel the prompt interface.

In some embodiments, when the controller is in a first mode, the controller is further configured to: enter the second mode from the first mode in response to an exit operation.

Figure 30:
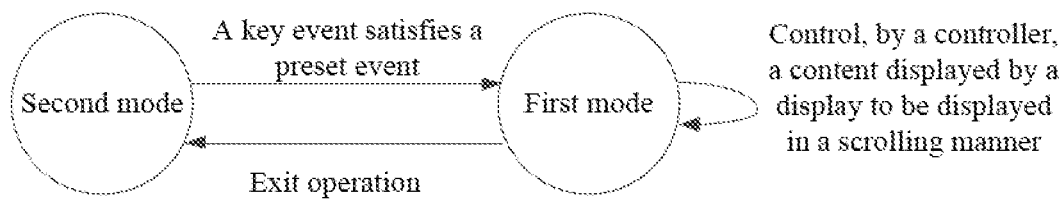
FIG. 30 is a schematic diagram of a switching process of a display apparatus between a first mode and a second mode according to some embodiments.

The exit operation may be, but not limited to, select a back key on the remote controller. FIG. 30 is a schematic diagram of a switching process in a display apparatus (controller) between a first mode and a second mode in some embodiments.

In some embodiments, in the second mode, the controller is further configured to: control a content presented on a display to move in response to a selection of a preset key on a remote controller, where the selection includes duration for selecting the preset key being greater than or equal to a third preset duration, or continuously selecting the preset key.

Figure 31:
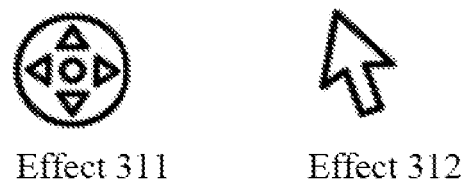
FIG. 31 is a schematic diagram of a focus according to some embodiments.

In order to help the user know whether the display apparatus is in the first mode or the second mode, in some embodiments, a focus displayed on the display in the first mode and the second mode is configured to different styles. FIG. 31 is a schematic diagram of a focus provided in some embodiments. When a display apparatus is in a first mode, a style of focus may refer to an effect 311 in FIG. 31, and when the display apparatus is in a second mode, the style of the focus may refer to an effect 312 in FIG. 31. In other embodiments, the style of the focus may be in other forms.

The embodiments of the disclosure further provide a display method. The display method includes:

if a received key event satisfies a preset event, entering a first mode; and in the first mode, controlling a content displayed on the display to be displayed in a scrolling manner in response to a selection of a preset key on a remote controller from a user.

The display method is suitable for a display apparatus, where the display apparatus at least includes a display, a remote controller and a controller. When a user utilizes the display apparatus to browse a webpage, a key event satisfying a preset event may be output by means of the remote controller, so as to make the display apparatus (the controller of the display apparatus) enter a first mode from a second mode. In response to a selection of the preset key on the remote controller from the user while the display apparatus is in the first mode, the controller may control the content displayed on the display to be displayed in a scrolling manner, such that the content displayed on the display is rapidly scrolled, and the user experience is excellent.

For ease of explanation, the foregoing description is provided in combination with specific embodiments. However, the above exemplary discussions are not intended to be exhaustive or to limit the embodiments to the specific forms disclosed above. Many modifications and variations may be obtained according to the above teaching. The above embodiments are chosen and described in order to better explain principles and practical application, so as to enable those skilled in the art to better use the implementations and various different modifications considered to be suitable for specific use.

What is claimed is:

1. A display apparatus, comprising:
a display, configured to display an image and/or a user interface;
a remote controller, comprising a plurality of keys and configured to: output an infrared signal carrying a first infrared key value in response to a selection of an integrated key from the user, wherein the integrated key is configured for replacing at least two omitted keys not disposed on the remote controller;
a memory, configured to store instructions and data associated with the display; and
at least one processor, in connection with the display and configured to respond a key event corresponding to a omitted key which is not disposed on the remote controller;
wherein the at least one processor is configured to execute the instructions to cause the display apparatus to:
identify an infrared key value of an infrared signal corresponding to the integrated key received from the remote controller;
control the display to display a key interface in response to the infrared key value being the first infrared key value, wherein the key interface comprises at least two first controls corresponding to the at least two omitted keys, wherein one first control corresponds to one key omitted on the remote controller; and
generate a target infrared key value in response to a selection of one of the at least two first controls from the user, wherein the target infrared key value is a key value of a omitted key corresponding to the selected first control.

2. The display apparatus according to claim 1, wherein the key interface further comprises at least one drop-down control; and the at least one processor is further configured to execute the instructions to cause the display apparatus to:
in response to a selection of the drop-down control from the user, control the display to display a key sub-interface, the key sub-interface comprising multiple second controls corresponding to multiple omitted keys on the remote controller.

3. The display apparatus according to claim 1, wherein the key interface further comprises a move control, and the key interface is configured to occupy a first portion of a whole display area on the display; and the at least one processor is further configured to execute the instructions to cause the display apparatus to:
in response to a selection of the move control from the user, control the key interface to move to a second portion of the whole display area on the display, in order to avoid blocking content of interest for the user on the display.

4. The display apparatus according to claim 1, wherein the at least one processor is further configured to execute the instructions to cause the display apparatus to:
while the key interface is presenting on the display, in response to a command for moving a focus, move the focus to another item on the key interface.

5. The display apparatus according to claim 2, wherein the second control comprises a digit control for indicating a one-digit number, the key sub-interface comprises 10 second controls for indicating digit keys 0 to 9 not arranged on the remote controller.

6. The display apparatus according to claim 2, wherein the at least one drop-down control further comprises a shortcut drop-down control, the second control in the shortcut drop-down control comprises a shortcut control corresponding to a shortcut color key omitted on the remote controller.

7. The display apparatus according to claim 5, wherein the second control in the key sub-interface comprises a confirmation control, and the at least one processor is further configured to execute the instructions to cause the display apparatus to:
in response to a selection of the confirmation control from the user, generate a second infrared key value, wherein the second infrared key value is related to one or more controls for indicating a one-digit number selected by the user within a preset time, and the preset time takes a selection of a first digit control for the first time as a starting point and takes a selection of the confirmation control as an ending point.

8. The display apparatus according to claim 1, wherein the remote controller comprises a first end and a second end opposite to the first end, the first end is used for emitting infrared signals, a cross section of the second end is greater than a cross section of the first end and an end surface of the second end is flat.

9. The display apparatus according to claim 1, wherein the remote controller comprises a first key and a second key for channel switching in a second mode of the display apparatus, wherein the at least one processor is further configured to execute the instructions to cause the display apparatus to:
while the display apparatus is in the second mode, receive a key event from the remote controller,
identify the key event as a preset event, control the display apparatus to enter into a first mode where a content on the display are displayed in scrolling manner based on a control of the first key and the second key, wherein the content on the display is presented via a browser in the display apparatus.

10. The display apparatus according to claim 6, wherein the shortcut control corresponding to the shortcut color key comprises a red control, a yellow control and a blue control, and the at least one processor is configured to execute the instructions to cause the display apparatus to:
control the display to enter a low blue light mode in response to a selection of the red control;
control the display to start an USB playing directly in response to a selection of the blue control; or
control the display to enter a motion playing mode in response to a selection of the yellow control.

11. A display method for a display apparatus, comprising:
identifying an infrared key value of an infrared signal corresponding to an integrated key received from a remote controller, wherein the remote controller comprises a plurality of keys and configured to: output an infrared signal carrying a first infrared key value in response to a selection of an integrated key from the user, wherein the integrated key is configured for replacing at least two omitted keys not disposed on the remote controller;
controlling a display of the display apparatus to display a key interface in response to the infrared key value being the first infrared key value, wherein the key interface comprises at least two first controls corresponding to the at least two omitted keys, wherein one first control corresponds to one key omitted on the remote controller; and
generating a target infrared key value in response to a selection of one of the at least two first controls from the user, wherein the target infrared key value is a key value of a omitted key corresponding to the selected first control.

12. The method according to claim 11, wherein the key interface further comprises at least one drop-down control; and the method further comprises:
in response to a selection of the drop-down control from the user, controlling the display to display a key sub-interface, the key sub-interface comprising multiple second controls corresponding to multiple omitted keys on the remote controller.

13. The method according to claim 11, wherein the key interface further comprises a move control, and the key interface is configured to occupy a first portion of a whole display area on the display; and the method further comprises:
in response to a selection of the move control from the user, controlling the key interface to move to a second portion of the whole display area on the display, in order to avoid blocking content of interest for the user on the display.

14. The method according to claim 11, further comprising:
while the key interface is presenting on the display, in response to a command for moving a focus, moving the focus to another item on the key interface.

15. The method according to claim 12, wherein the second control comprises a digit control for indicating a one-digit number, the key sub-interface comprises 10 second controls for indicating digit keys 0 to 9 not arranged on the remote controller.

16. The method according to claim 12, wherein the at least one drop-down control further comprises a shortcut drop-down control, the second control in the shortcut drop-down control comprises a shortcut control corresponding to a shortcut color key omitted on the remote controller.

17. The method according to claim 16, wherein the second control in the key sub-interface comprises a confirmation control, the method further comprises:
generating a second infrared key value in response to a selection of the confirmation control from the user;
wherein the second infrared key value is related to one or more controls for indicating a one-digit number selected by the user within a preset time, and the preset time takes a selection of a first digit control for the first time as a starting point and takes a selection of the confirmation control as an ending point.

18. The method according to claim 11, wherein the remote controller comprises a first end and a second end opposite to the first end, the first end is used for emitting infrared signals, a cross section of the second end is greater than a cross section of the first end, and an end surface of the second end is flat.

19. The method according to claim 11, wherein the remote controller comprises a first key and a second key for channel switching in a second mode of the display apparatus, and the method further comprises:
receiving a key event from the remote controller while the display apparatus is in the second mode;
identifying the key event as a preset event; and
controlling the display apparatus to enter into a first mode where a content on the display are displayed in scrolling manner based on a control of the first key and the second key, wherein the content on the display is presented via a browser in the display apparatus.

20. The method according to claim 16, wherein the shortcut control corresponding to the shortcut color key comprises a red control, a yellow control and a blue control, and the method further comprises:
- controlling the display to enter a low blue light mode in response to a selection of the red control;
- controlling the display to start an USB playing directly in response to a selection of the blue control; or
- controlling the display to enter a motion playing mode in response to a selection of the yellow control.

* * * * *